(12) United States Patent
Kakinoki et al.

(10) Patent No.: US 11,567,585 B2
(45) Date of Patent: Jan. 31, 2023

(54) INPUT DETECTION SYSTEM

(71) Applicant: Japan Display Inc., Tokyo (JP)

(72) Inventors: Yuto Kakinoki, Tokyo (JP); Makoto Hayashi, Tokyo (JP); Takaaki Kono, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/496,137

(22) Filed: Oct. 7, 2021

(65) Prior Publication Data
US 2022/0113812 A1    Apr. 14, 2022

(30) Foreign Application Priority Data
Oct. 9, 2020  (JP) .............................. JP2020-171349

(51) Int. Cl.
*G06F 3/02*      (2006.01)
*G06F 3/044*     (2006.01)

(52) U.S. Cl.
CPC .......... *G06F 3/0227* (2013.01); *G06F 3/0443* (2019.05)

(58) Field of Classification Search
CPC .. G06F 3/0227; G06F 3/0443; G06F 3/04166; G06F 3/0445; G06F 3/0446; G06F 3/0362; G06F 3/0393
See application file for complete search history.

(56) References Cited

U.S. PATENT DOCUMENTS

| | | | |
|---|---|---|---|
| 2017/0336897 A1* | 11/2017 | Zachut | .................... G06F 3/046 |
| 2020/0301547 A1 | 9/2020 | Mori et al. | |
| 2021/0232269 A1* | 7/2021 | Sasaki | ................... G06F 3/0446 |

FOREIGN PATENT DOCUMENTS

| | | |
|---|---|---|
| JP | 6342105 B1 | 6/2018 |
| JP | 6532631 B1 | 6/2019 |

* cited by examiner

*Primary Examiner* — Md Saiful A Siddiqui
(74) *Attorney, Agent, or Firm* — K&L Gates LLP

(57) ABSTRACT

An input detection system includes a plurality of electrodes aligned in a detection region, a drive signal supply circuit configured to supply a drive signal to the electrodes, a detection circuit configured to detect signals from the electrodes, an input support device including an LC circuit and a first electrode and a second electrode coupled to the LC circuit and arranged so as to overlap with the electrodes, a first calculation circuit configured to detect the input support device based on an output signal output from the detection circuit, and a second calculation circuit configured to detect a detection target different from the input support device based on the output signal.

17 Claims, 22 Drawing Sheets

INPUT DETECTION SYSTEM

CROSS-REFERENCE TO RELATED APPLICATION

This application claims the benefit of priority from Japanese Patent Application No. 2020-171349 filed on Oct. 9, 2020, the entire contents of which are incorporated herein by reference.

BACKGROUND

1. Technical Field

The present disclosure relates to an input detection system.

2. Description of the Related Art

Japanese Patent Nos. 6342105 and 6532631 describe an input support device that is placed on a touch panel configured to detect change in electrostatic capacitance or change in a contact region and supports input operations through the touch panel (referred to as an operation knob or a knob in Japanese Patent Nos. 6342105 and 6532631). Japanese Patent No. 6532631 describes that a frequency of a drive signal to be applied to electrodes is changed and frequency characteristics of impedance of the input support device brought into contact with the touch panel are provided based on detection signals provided from the same electrode.

In an input detection system using the above-mentioned input support device, for example, detection by driving the electrodes at a resonant frequency of the input support device and detection by driving the electrodes at a non-resonant frequency can be performed in a time division manner. The input support device and a detection target such as a finger can be detected with respective detection values provided by driving at different frequencies. When the electrodes are driven at different frequencies, there is however the possibility that time required for detection is increased and a detection report rate is lowered.

SUMMARY

An input detection system according to an embodiment of the present disclosure includes a plurality of electrodes aligned in a detection region, a drive signal supply circuit configured to supply a drive signal to the electrodes, a detection circuit configured to detect signals from the electrodes, an input support device including an LC circuit and a first electrode and a second electrode coupled to the LC circuit and arranged so as to overlap with the electrodes, a first calculation circuit configured to detect the input support device based on an output signal output from the detection circuit, and a second calculation circuit configured to detect a detection target different from the input support device based on the output signal.

An input detection system according to an embodiment of the present disclosure includes a plurality of electrodes aligned in a detection region, a drive signal supply circuit configured to supply a drive signal to the electrodes, a detection circuit configured to detect signals from the electrodes, an input support device including an LC circuit and a first electrode and a second electrode coupled to the LC circuit and arranged so as to overlap with the electrodes, a fitting processing circuit configured to fit a relation between a plurality of detection values that an output signal output from the detection circuit contains and time to calculate an approximate expression, and a calculation circuit configured to detect at least one of the input support device and a detection target different from the input support device based on a plurality of pieces of information of the approximate expression received from the fitting processing circuit.

DETAILED DESCRIPTION

Figure 1:
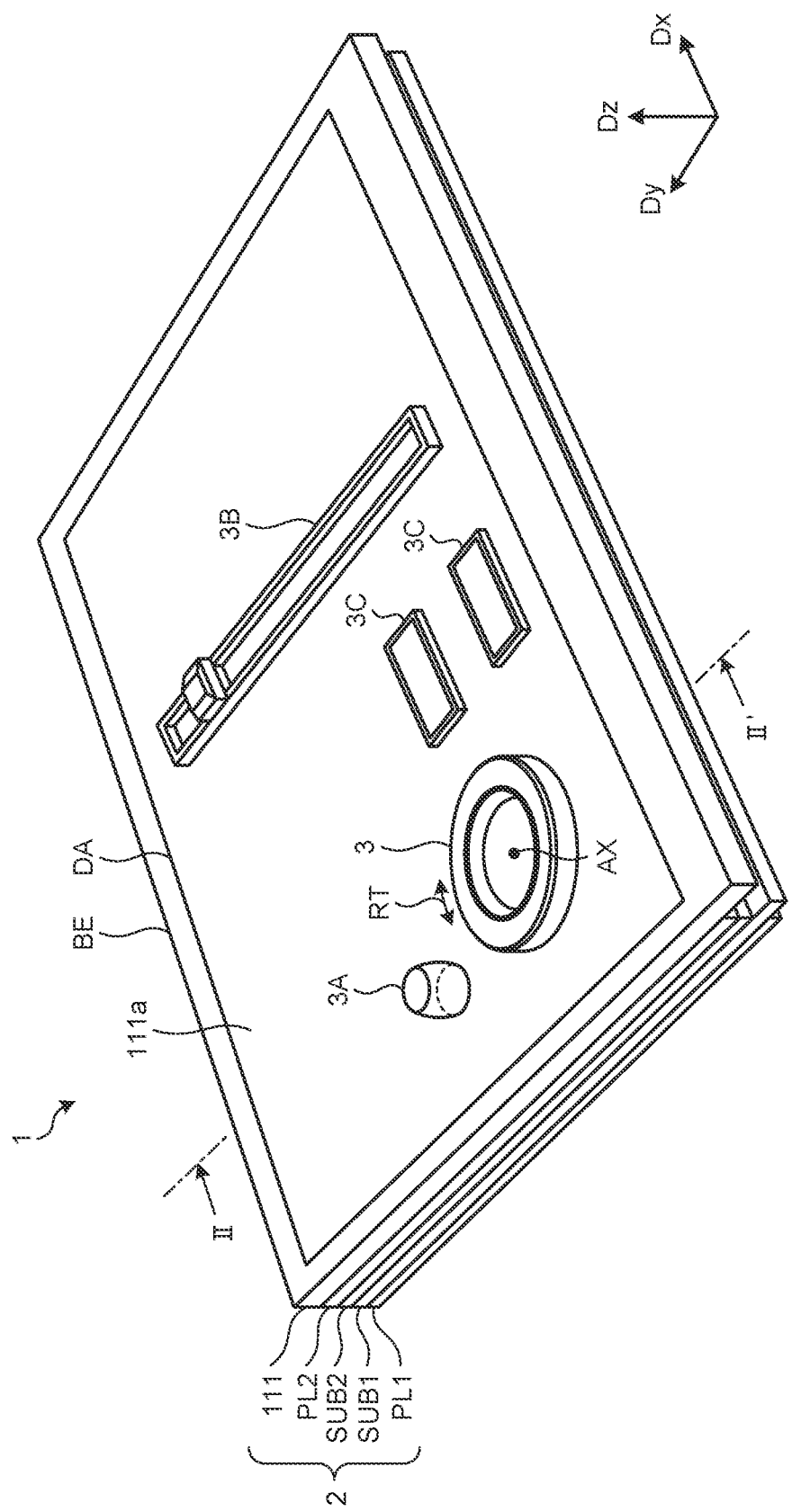
FIG. 1 is a perspective view schematically illustrating an input detection system according to a first embodiment.

Aspects for carrying out the present disclosure (embodiments) will be described in detail with reference to the drawings. Contents described in the following embodiments do not limit the present disclosure. Components described below include those that can be easily assumed by those skilled in the art and substantially the same components. Furthermore, the components described below can be appropriately combined. What is disclosed herein is merely an example, and appropriate modifications within the gist of the disclosure of which those skilled in the art can easily think are naturally encompassed in the scope of the present disclosure. In the drawings, widths, thicknesses, shapes, and the like of the components can be schematically illustrated in comparison with actual aspects for more clear explanation. They are however merely examples and do not limit interpretation of the present disclosure. In the present disclosure and the drawings, the same reference numerals denote components similar to those described before with reference to the drawing that has been already referred, and detail explanation thereof can be appropriately omitted.

In the present specification and the scope of the disclosure, when an aspect in which another structure is arranged above a certain structure is represented, simple expression "above" includes both of the case in which another structure is arranged just above the certain structure and the case in which another structure is arranged above the certain structure with still another structure interposed therebetween unless otherwise specified.

First Embodiment

Figure 2:
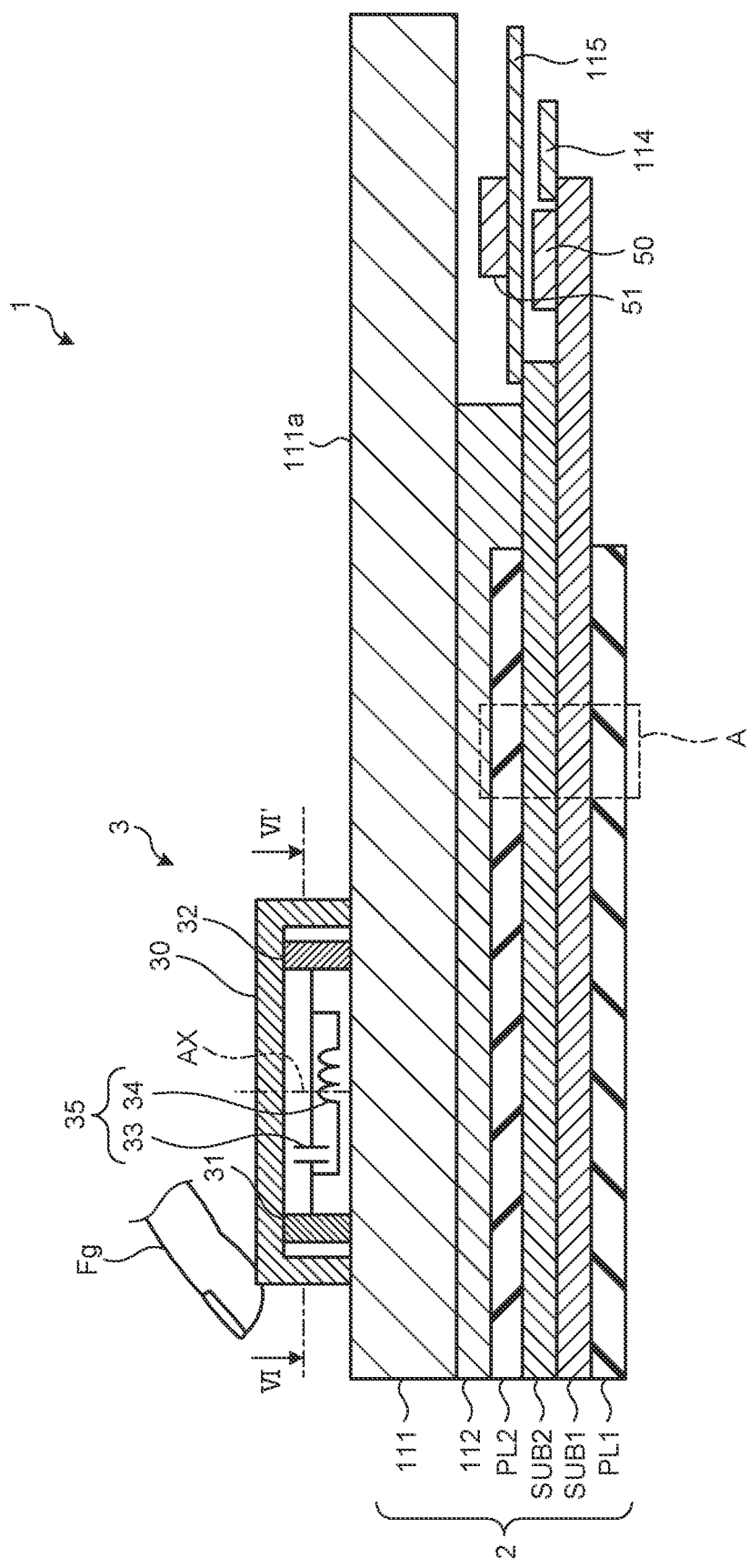
FIG. 2 is a cross-sectional view cut along line II-II' in FIG. 1.

FIG. 1 is a perspective view schematically illustrating an input detection system according to a first embodiment. FIG. 2 is a cross-sectional view cut along line II-II' in FIG. 1. As illustrated in FIG. 1 and FIG. 2, an input detection system 1 includes a display device 2 and an input support device 3.

One direction of a plane (upper surface 111a) of the display device 2 is a first direction Dx, and a direction orthogonal to the first direction Dx is a second direction Dy. The second direction Dy is not limited to be orthogonal to the first direction Dx and may intersect with the first direction Dx at an angle other than 90°. A third direction Dz orthogonal to the first direction Dx and the second direction Dy corresponds to the thickness direction of an array substrate SUB1.

As illustrated in FIG. 1, the display device 2 includes the array substrate SUB1, a counter substrate SUB2, a first polarizing plate PL1, a second polarizing plate PL2, a cover member 111, and an adhesive layer 112 (refer to FIG. 2). The first polarizing plate PL1, the array substrate SUB1, the counter substrate SUB2, the second polarizing plate PL2, the adhesive layer 112, and the cover member 111 are stacked in this order in the third direction Dz.

The array substrate SUB1 is a drive circuit substrate for driving a plurality of pixels PX. The array substrate SUB1 includes a first substrate 10 as a base body. The array substrate SUB1 includes switching elements Tr and various wiring lines such as scan lines GL and pixel signal lines SL (refer to FIG. 4) provided on the first substrate 10. The counter substrate SUB2 is provided so as to face the array substrate SUB1 and includes a second substrate 20 as a base body. The counter substrate SUB2 includes color filters CF and a light shielding layer BM (refer to FIG. 3) provided on the second substrate 20. The first substrate 10 and the second substrate 20 are made of a material having a light transmitting property, such as a glass substrate and a resin substrate.

The length of the array substrate SUB1 in the second direction Dy is larger than the length of the counter substrate SUB2 in the second direction Dy. As illustrated in FIG. 1, the array substrate SUB1 (first substrate 10) has a portion (protruding portion) projecting to the outer side rather than the counter substrate SUB2 (second substrate 20). The lengths of the array substrate SUB1 and the counter substrate SUB2 in the second direction Dy are smaller than the lengths thereof in the first direction Dx. The lengths are however not limited to be set in this manner, and the lengths of the array substrate SUB1 and the counter substrate SUB2 in the second direction Dy may be larger than the lengths thereof in the first direction Dx.

As illustrated in FIG. 1, a peripheral region BE is provided on the outer side of a display region DA in the display device 2. The display region DA is formed to have a square shape but the outer shape of the display region DA is not limited thereto. For example, the display region DA may have a substantially square shape with curved corners or may have a cutout. Alternatively, the display region DA may have another polygonal shape or another shape such as a circular shape and an elliptic shape.

The display region DA is a region for displaying an image and is a region in which the pixels PX are provided. The peripheral region BE indicates a region on the inner side of the outer circumference of the array substrate SUB1 and on the outer side of the display region DA. The peripheral region BE may have a frame shape surrounding the display region DA, and in this case, the peripheral region BE can also be referred to as a frame region.

As illustrated in FIG. 2, a display integrated circuit (IC) 50 and a wiring substrate 114 are coupled to the protruding portion of the array substrate SUB1. The display IC 50 includes a control circuit that controls display of the display device 2 and touch detection. The display IC 50 is not limited to this example and may be mounted on the wiring substrate 114. Arrangement of the display IC 50 is not limited thereto, and the display IC 50 may be provided on a control substrate or a flexible substrate outside the module, for example.

A wiring substrate 115 is coupled to the counter substrate SUB2. A detection IC 51 is mounted on the wiring substrate 115. The detection IC 51 includes a detection circuit 55 (refer to FIG. 7) and receives supply of detection signals Vdet from detection electrodes Rx. The detection IC 51 can detect a detection target such as a finger Fg and the input support device (input device) 3 based on the detection signals Vdet. Arrangement of the detection IC 51 is not limited thereto, and the detection IC 51 may be provided on a control substrate or a flexible substrate outside the module, for example.

Each of the wiring substrate 114 and the wiring substrate 115 is configured by, for example, a flexible printed circuits (FPC). The wiring substrate 114 is coupled to a plurality of terminals of the first substrate 10. The wiring substrate 115 is coupled to a plurality of terminals of the second substrate 20.

As illustrated in FIG. 1 and FIG. 2, the input support device 3 is arranged (mounted) on the upper surface 111a of the cover member 111 for use. A user can perform an input operation on the display device 2 by operating the input support device 3 arranged above the display device 2. The input support device 3 is, for example, a rotary knob and has an annular shape in a plan view when seen from the upper surface 111a of the display device 2. The display device 2 can detect a position of the input support device 3 in a plane and a rotation operation RT centered on a rotating axis AX. That is to say, in the present embodiment, the display region DA is a region in which a plurality of drive electrodes Tx and the detection electrodes Rx (refer to FIG. 5) are provided and serves also as a detection region.

As illustrated in FIG. 2, the input support device 3 includes a housing 30, a first electrode 31, a second electrode 32, and an LC circuit 35. The housing 30 is made of, for example, an insulating resin material and is a hollow member in which a space is provided. The first electrode 31, the second electrode 32, and the LC circuit 35 are provided in the housing 30. The LC circuit 35 configures an LC resonance circuit in which a capacitor 33 and an inductor 34 are coupled in parallel with each other. The first electrode 31 is coupled to one end side of the LC circuit 35 (coupling portions of the capacitor 33 and the inductor 34 on one end side). The second electrode 32 is coupled to the other end side of the LC circuit 35 (coupling portions of the capacitor 33 and the inductor 34 on the other end side). The display device 2 can detect positions of the first electrode 31 and the second electrode 32 using LC resonance of the LC circuit 35.

The housing 30 has an annular shape having a through-hole formed in a region overlapping with the rotating axis AX. The housing 30 may however have a circular shape having no through-hole. FIG. 2 illustrates the housing 30 having no through-hole in order to schematically illustrate the LC circuit 35.

FIG. 1 illustrates a plurality of input support devices 3A, 3B, and 3C as other examples of the input support device 3. The input support device 3A is a rotary knob and is formed into a tab shape having no through-hole unlike the input support device 3. The input support device 3B is a slider, and an input operation can be performed by displacing a tab thereof in a plane. The input support device 3B has a bar-like shape in a plan view. The input support device 3C is a button or an input key, and an input operation can be performed by touching the input support device 3C or performing a press-in operation thereon. The input detection system 1 is not limited to have the configuration in which all of the input support devices 3, 3A, 3B, and 3C are mounted, and it is sufficient that at least equal to or more than one of the input support devices 3, 3A, 3B, and 3C is provided. Hereinafter, the input support device 3 is described. Explanation of the input support device 3 can be applied also to the other input support devices 3A, 3B, and 3C.

Figure 3:
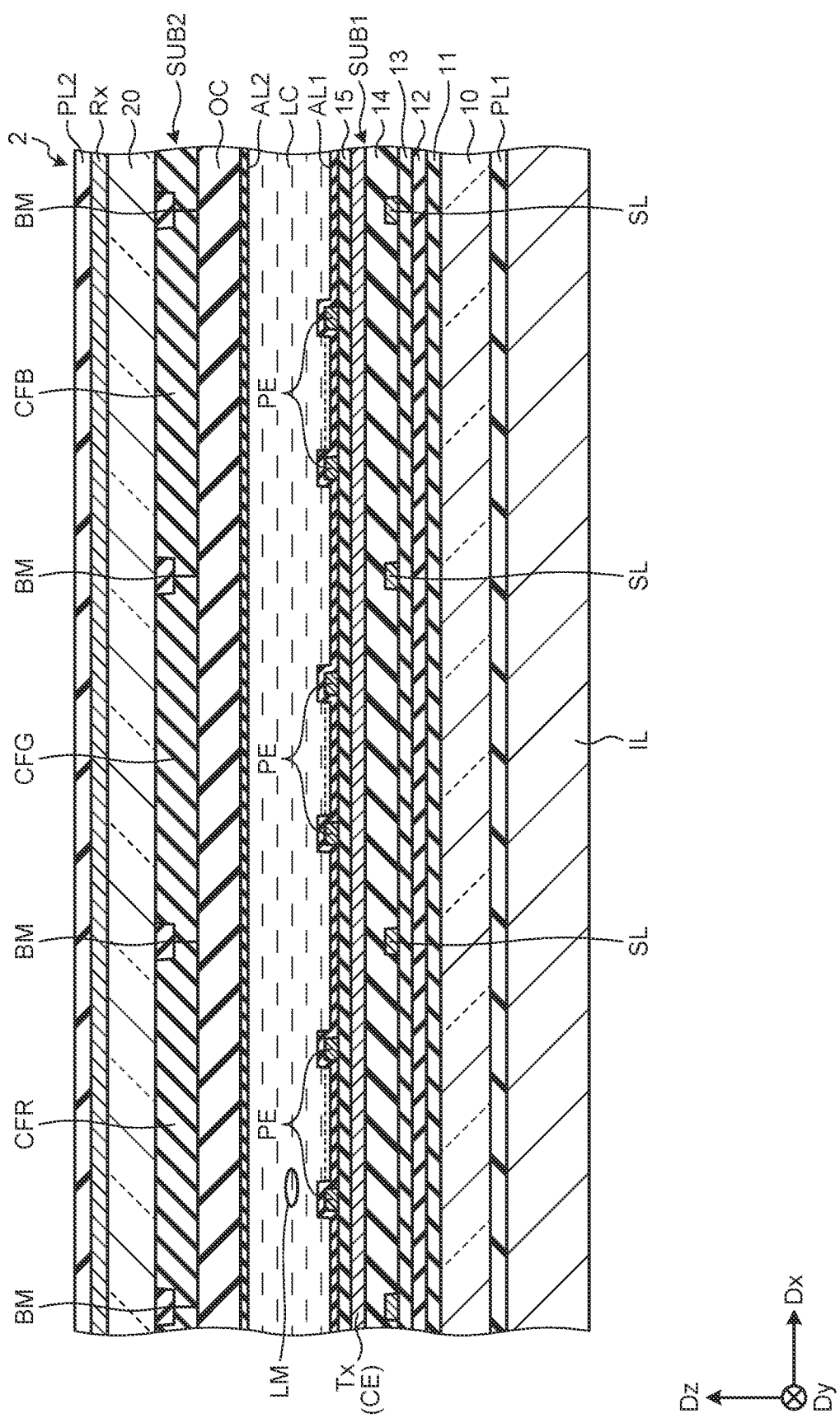
FIG. 3 is a cross-sectional view illustrating the schematic cross-sectional configuration of a display device.

FIG. 3 is a cross-sectional view illustrating the schematic cross-sectional configuration of the display device. FIG. 3 is a cross-sectional view of a part surrounded by a region A in FIG. 2, for example. As illustrated in FIG. 3, the display device 2 further includes an illumination device IL. The counter substrate SUB2 is arranged so as to face the surface of the array substrate SUB1 in the vertical direction. A liquid crystal layer LC is provided between the array substrate SUB1 and the counter substrate SUB2. The liquid crystal layer LC as a display function layer is arranged between the first substrate 10 and the second substrate 20. The illumination device IL, the first polarizing plate PL1, the array substrate SUB1, the counter substrate SUB2, and the second polarizing plate PL2 are stacked in this order in the third direction Dz.

The array substrate SUB1 faces the illumination device IL, and the counter substrate SUB2 is located on the display surface side. The illumination device IL emits light toward the array substrate SUB1. For example, a side light-type backlight or a direct-type backlight can be applied to the illumination device IL. Although various aspects can be applied to the illumination device IL, explanation of the detail configurations thereof is omitted.

An optical element including the first polarizing plate PL1 faces the first substrate 10. To be more specific, the first polarizing plate PL1 is arranged on the outer surface of the first substrate 10 or on the surface thereof facing the illumination device IL. An optical element including the second polarizing plate PL2 faces the second substrate 20. To be more specific, the second polarizing plate PL2 is arranged on the outer surface of the second substrate 20 or on the surface thereof on an observation position side. A first polarization axis of the first polarizing plate PL1 and a second polarization axis of the second polarizing plate PL2 have a crossed Nicol positional relation in an X-Y plane, for example. The optical elements including the first polarizing plate PL1 and the second polarizing plate PL2 may include another optical function element such as a phase difference plate.

The array substrate SUB1 includes insulating films 11, 12, 13, 14, and 15, the pixel signal lines SL, pixel electrodes PE, the drive electrodes Tx (common electrodes CE), a first orientation film AL1, and the like on the side of the first substrate 10 that faces the counter substrate SUB2.

In the present specification, the direction toward the second substrate 20 from the first substrate 10 in the direction perpendicular to the first substrate 10 is an "upper-side" or simply an "above". The direction toward the first substrate 10 from the second substrate 20 is a "lower-side" or simply a "downward". The expression "plan view" indicates a positional relation when seen from the direction perpendicular to the first substrate 10.

The insulating film 11 is provided above the first substrate 10. The insulating films 11, 12, and 13, and the insulating film 15 are, for example, inorganic insulating films made of an inorganic material having a light transmitting property, such as silicon oxide and silicon nitride.

The insulating film 12 is provided above the insulating film 11. The insulating film 13 is provided above the insulating film 12. The pixel signal lines SL are provided above the insulating film 13. The insulating film 14 is provided above the insulating film 13 and covers the pixel signal lines SL. The insulating film 14 is made of a resin material having a light transmitting property and has a film thickness that is larger than that of the other insulating films made of the inorganic material. Although not illustrated in FIG. 3, the scan lines GL are provided above the insulating film 12, for example.

The drive electrodes Tx are provided above the insulating film 14. The drive electrodes Tx are provided in the display region DA and are divided into a plurality of parts by slits. The drive electrodes Tx are covered by the insulating film 15. The drive electrodes Tx serve as the drive electrodes Tx for touch detection and the common electrodes CE in display.

The pixel electrodes PE are provided above the insulating film 15 and face the drive electrodes Tx with the insulating film 15 interposed therebetween. The pixel electrodes PE and the drive electrodes Tx are made of, for example, a conductive material having a light transmitting property, such as indium tin oxide (ITO) and indium zinc oxide (IZO). The first orientation film AL1 covers the pixel electrodes PE and the insulating film 15.

The counter substrate SUB2 includes the light shielding layer BM, color filters CFR, CFG, and CFB, an overcoat layer OC, a second orientation film AL2, and the like on the side of the second substrate 20 that faces the array substrate SUB1. The counter substrate SUB2 includes the detection electrodes Rx and the second polarizing plate PL2 on the side of the second substrate 20 that is opposite to the array substrate SUB1.

The light shielding layer BM is located on the side of the second substrate 20 that face the array substrate SUB1 in the display region DA. The light shielding layer BM defines openings that respectively face the pixel electrodes PE. The pixel electrodes PE are partitioned for the respective openings of the pixels PX. The light shielding layer BM is made of a resin material in black color or a metal material having a light shielding property.

The color filters CFR, CFG, and CFB are located on the side of the second substrate 20 that faces the array substrate SUB1, and end portions thereof overlap with the light shielding layer BM. As an example, the color filters CFR, CFG, and CFB are made of a resin material colored with red, green, and blue, respectively.

The overcoat layer OC covers the color filters CFR, CFG, and CFB. The overcoat layer OC is made of a resin material having a light transmitting property. The second orientation film AL2 covers the overcoat layer OC. The first orientation film AL1 and the second orientation film AL2 are made of, for example, a material exhibiting horizontal orientation performance.

The detection electrodes Rx are provided above the second substrate 20. The detection electrodes Rx are metal wiring made of a conductive material, for example. Alternatively, the detection electrodes Rx may be made of a conductive material having a light transmitting property, such as ITO.

The array substrate SUB1 and the counter substrate SUB2 are arranged such that the first orientation film AL1 and the second orientation film AL2 face each other. The liquid crystal layer LC is enclosed into between the first orientation film AL1 and the second orientation film AL2. The liquid crystal layer LC is made of a negative liquid crystal material having a negative dielectric anisotropy or a positive liquid crystal material having a positive dielectric anisotropy.

For example, when the liquid crystal layer LC is made of the negative liquid crystal material and a state in which no voltage is applied to the liquid crystal layer LC is established, liquid crystal molecules LM are initially oriented in such a direction that long axes thereof are along the first direction Dx in the X-Y plane. On the other hand, in a state in which a voltage is applied to the liquid crystal layer LC, that is, in an ON state in which an electric field is formed between the pixel electrodes PE and the drive electrodes Tx, the liquid crystal molecules LM receive influences of the electric field and orientation states thereof are changed. In the ON state, a polarization state of incident linearly polarized light is changed in accordance with the orientation states of the liquid crystal molecules LM when it passes through the liquid crystal layer LC.

Figure 4:
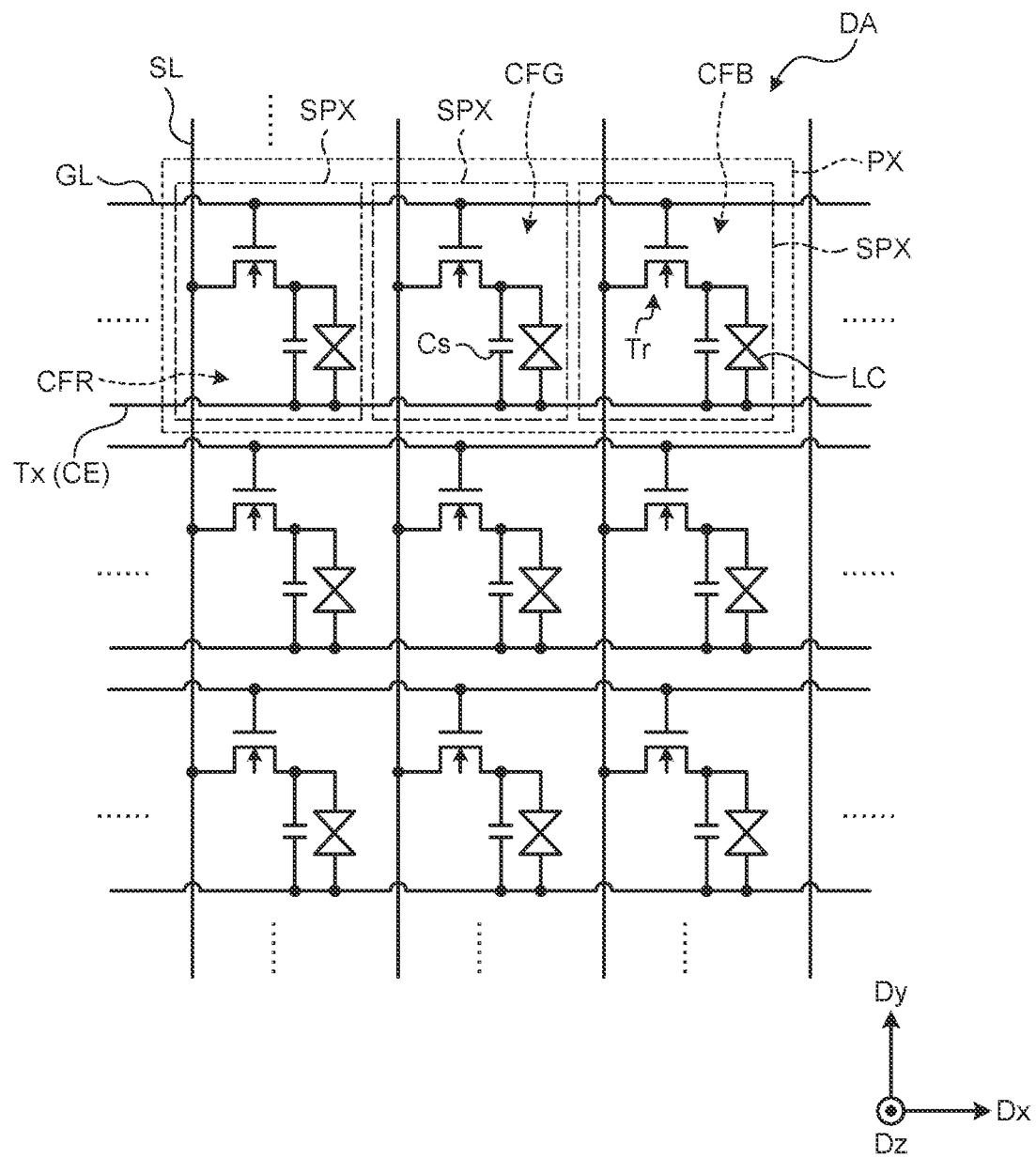
FIG. 4 is a circuit diagram illustrating pixel array of a display region.

FIG. 4 is a circuit diagram illustrating pixel array of the display region. The switching elements Tr of respective sub pixels SPX, the pixel signal lines SL, and the scan lines GL illustrated in FIG. 4, and the like are formed on the array substrate SUB1. The pixel signal lines SL extend in the second direction Dy. The pixel signal lines SL are wiring lines configured to supply pixel signals VSG to the pixel electrodes PE (refer to FIG. 3). The scan lines GL extend in the first direction Dx. The scan lines GL are wiring lines configured to supply a drive signal (scan signal) for driving the switching elements Tr.

Each pixel PX includes the sub pixels SPX. Each sub pixel SPX includes the switching element Tr and capacitance of the liquid crystal layer LC. The switching element Tr is formed by a thin film transistor and, in this example, is formed by an n-channel metal oxide semiconductor (MOS)-type TFT. The insulating film 15 is provided between the pixel electrodes PE and the drive electrodes Tx illustrated in FIG. 3, and these components form holding capacitors Cs illustrated in FIG. 4.

Color regions colored with three colors of red (R), green (G), and blue (B), for example, are periodically arrayed as the color filters CFR, CFG, and CFB. The color regions of the three colors of R, G, and B as one set are made to respectively correspond to the sub pixels SPX. A set of sub pixels SPX corresponding to the color regions of the three colors configures the pixel PX. The color filters may include color regions of equal to or more than four colors. In this case, the pixel PX may include equal to or more than four sub pixels SPX.

Figure 5:
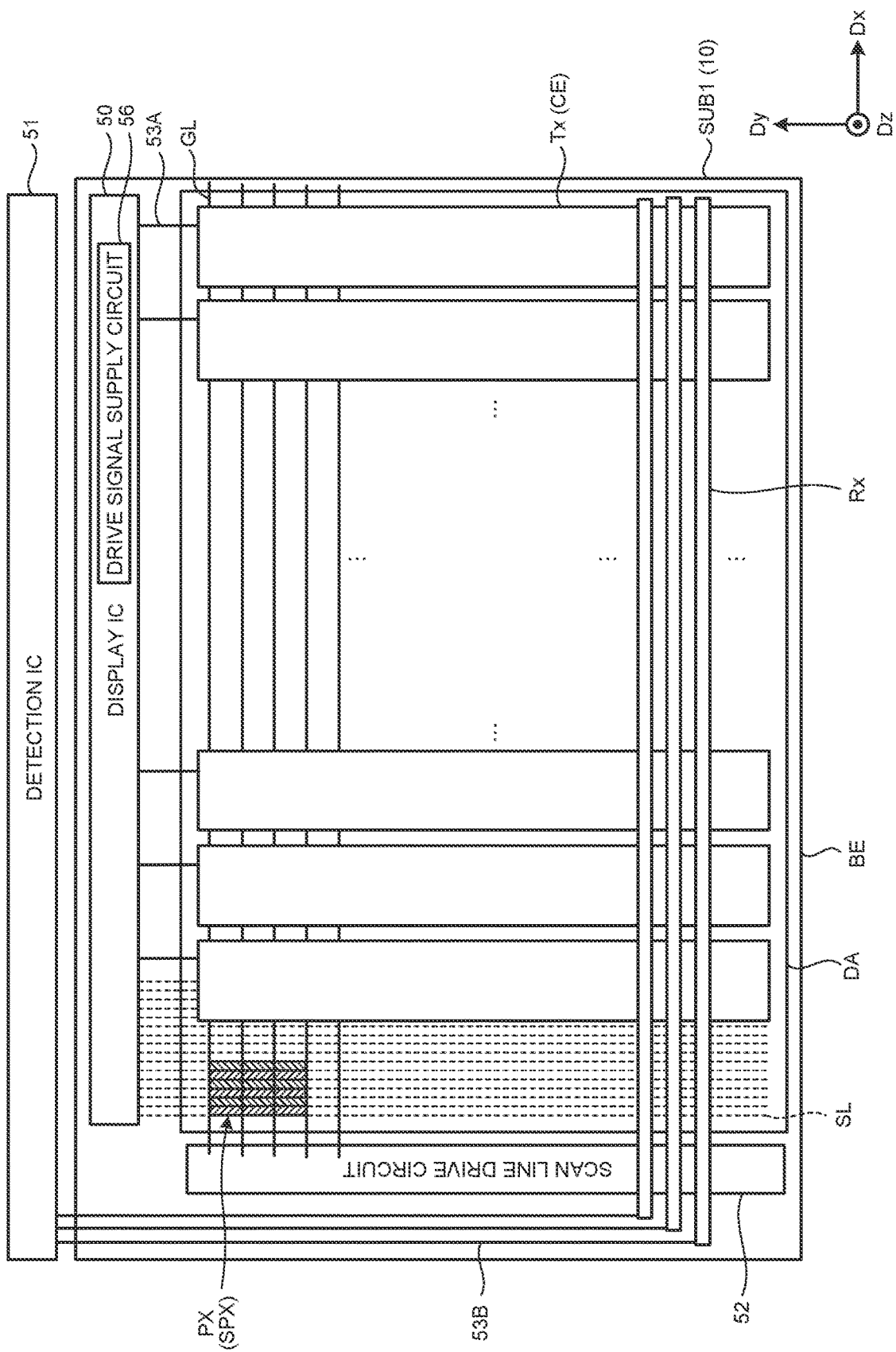
FIG. 5 is a plan view schematically illustrating an array substrate included in the display device.

FIG. 5 is a plan view schematically illustrating the array substrate included in the display device. FIG. 5 schematically illustrates a part of the detection electrodes Rx provided on the counter substrate SUB2 in order to explain the relation between the drive electrodes Tx and the detection electrodes Rx. As illustrated in FIG. 5, the pixels PX (sub pixels SPX) are arrayed in a matrix with a row-column configuration in the display region DA. The pixel signal lines SL and the scan lines GL are provided so as to correspond to the pixel electrodes PE and the switching elements Tr that the sub pixels SPX have. The pixel signal lines SL are coupled to the control circuit such as the display IC 50 provided in the peripheral region BE. A scan line drive circuit 52 is provided in a region extending along the second direction Dy in the peripheral region BE. The scan lines GL are coupled to the scan line drive circuit 52. The scan line drive circuit 52 is a circuit configured to supply the scan signal for driving the switching elements Tr of the pixels PX (sub pixels SPX) to the scan lines GL.

The drive electrodes Tx extend in the second direction Dy and are aligned in the first direction Dx. The drive electrodes Tx are coupled to the display IC 50 through respective coupling wiring lines 53A. Each of the detection electrodes Rx extends in the first direction DX, being aligned in the second direction Dy. The detection electrodes Rx are coupled to the detection IC 51 through coupling wiring lines 53B. The drive electrodes Tx and the detection electrodes Rx are provided so as to intersect with each other in a plan view. An electrostatic capacitance is formed in each of intersecting portions of the drive electrodes Tx and the detection electrodes Rx. The detection IC 51 can detect the detection target based on the detection signals Vdet that are output in accordance with change in the mutual electrostatic capacitances between the drive electrodes Tx and the detection electrodes Rx.

Although FIG. 5 illustrates only some drive electrodes Tx, some detection electrodes Rx, and some pixels PX (sub pixels SPX) in order to make the drawing easy to view, the drive electrodes Tx, the detection electrodes Rx, and the pixels PX are arranged on the entire display region DA. That is to say, the pixels PX are arranged so as to overlap with one drive electrode Tx. One drive electrode Tx is arranged so as to overlap with the pixel signal lines SL.

The drive electrodes Tx serve as the common electrodes CE to the pixel electrodes PE in a display period and the drive electrodes Tx configured to detect the detection target such as the finger Fg and the input support device 3 in a touch detection period. To be specific, the display IC 50 supplies a display drive signal VCOM to the drive electrodes Tx in display. The display IC 50 includes at least a drive signal supply circuit 56. The drive signal supply circuit 56 sequentially supplies a detection drive signal VD to the drive electrodes Tx. In the display device 2, the display period and the touch detection period are alternately repeated, and the signal to be supplied to the drive electrodes Tx is switched every period.

To be specific, in touch detection of detecting a position of the finger Fg, the display IC 50 (drive signal supply circuit 56) supplies the detection drive signal VD to the drive electrodes Tx, and the detection signals Vdet based on change in the mutual electrostatic capacitances are output to the detection IC 51. The detection IC 51 thereby detects contact or proximity of the finger Fg.

In input support device detection of detecting the input support device 3, the display IC 50 (drive signal supply circuit 56) supplies the detection drive signal VD to the drive electrodes Tx, and the detection IC 51 detects a position and the like of the input support device 3 utilizing the change in the mutual electrostatic capacitances and the resonance of the LC circuit 35 included in the input support device 3.

Figure 6:
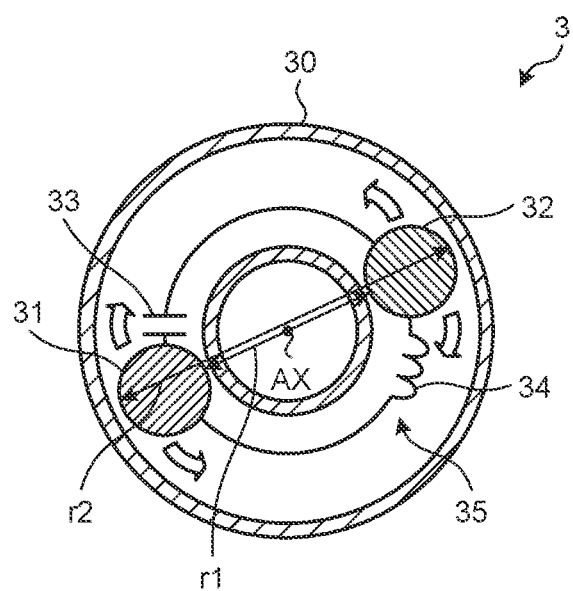
FIG. 6 is a cross-sectional view cut along line VI-VI' in FIG. 2.

Next, a method for detecting the input support device 3 will be described with reference to FIG. 6 to FIG. 8. FIG. 6 is a cross-sectional view cut along line VI-VI' in FIG. 2. FIG. 6 schematically illustrates the cross-sectional view by cutting the input support device 3 along a plane parallel with the upper surface 111a (refer to FIG. 1). The input support device 3 has a circular shape in a plan view as illustrated in FIG. 6. The first electrode 31 and the second electrode 32 are arranged on the opposite sides with the rotating axis AX interposed therebetween in a plan view. The first electrode 31 and the second electrode 32 have circular shapes in a plan view. The shapes thereof are however not limited thereto, and the first electrode 31 and the second electrode 32 may have another shapes such as square shapes and polygonal shapes. The first electrode 31 and the second electrode 32 may have different shapes. In the following explanation, the shortest distance between the first electrode 31 and the second electrode 32 is a first distance r1. The longest distance between the first electrode 31 and the second electrode 32 is a second distance r2. In other words, the first distance r1 is equal to the diameter of an inscribed circle of the first electrode 31 and the second electrode 32. The second distance r2 is equal to the diameter of a circumscribed circle of the first electrode 31 and the second electrode 32. The first electrode 31 and the second electrode 32 are provided so as to be rotatable on a concentric circle centered on the rotating axis AX by the rotation operation RT of the input support device 3.

Although FIG. 6 equivalently illustrates the capacitor 33 and the inductor 34 configuring the LC circuit 35, for example, the LC circuit 35 may be formed by a chip component mounted on a substrate. It is sufficient that the capacitor 33 and the inductor 34 are coupled electrically in parallel between the first electrode 31 and the second electrode 32, and arrangement thereof in the housing 30 may be desirably set.

Figure 7:
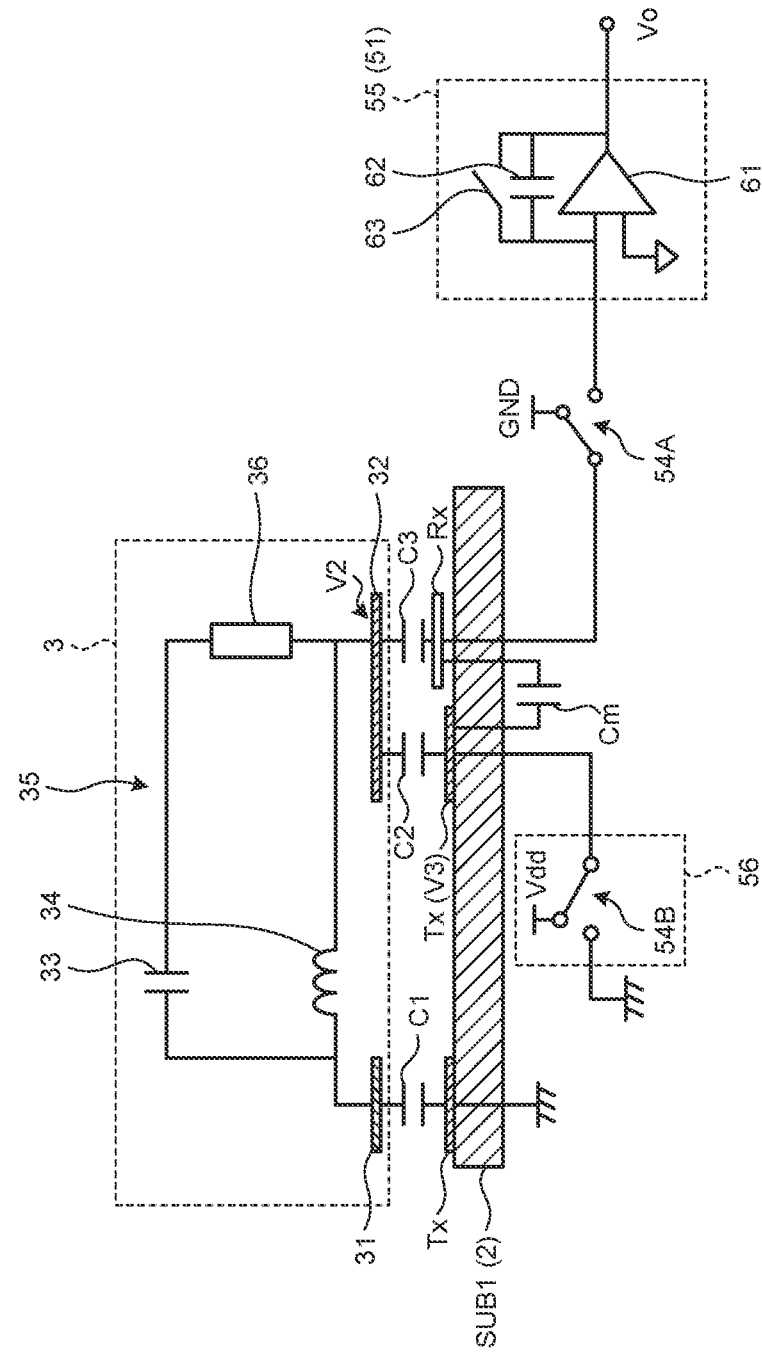
FIG. 7 is a descriptive view for explaining a method for detecting an input support device.

FIG. 7 is a descriptive view for explaining the method for detecting the input support device. FIG. 8 is a timing waveform chart for explaining the method for detecting the input support device. As illustrated in FIG. 7, each of the first electrode 31 and the second electrode 32 of the input support device 3 is arranged so as to face the drive electrode Tx of the array substrate SUB1 and/or the detection electrode Rx of the counter substrate SUB2 at certain timing in the touch detection period. FIG. 7 schematically illustrates the drive electrodes Tx and the detection electrode Rx on the same substrate. Illustration of the detection electrode Rx facing the first electrode 31 is omitted.

A capacitance C1 is formed between the first electrode 31 and one drive electrode Tx. One drive electrode Tx is coupled to a reference potential (for example, a reference potential Vdc). A capacitance C2 is formed between the second electrode 32 and the other drive electrode Tx. The other drive electrode Tx is coupled to a power supply potential Vdd or the reference potential (for example, the reference potential Vdc) through a switch element 54B.

A capacitance C3 is formed between the second electrode 32 and the detection electrode Rx. The detection electrode Rx is coupled to the detection circuit 55 or a reference potential (for example, a ground potential GND) through a switch element 54A. A mutual electrostatic capacitance Cm is formed between the drive electrode Tx and the detection electrode Rx.

The detection circuit 55 is a signal processing circuit provided in the detection IC 51 and is a circuit that receives the detection signals Vdet (refer to FIG. 8) output from the detection electrodes Rx and performs predetermined signal processing thereon to output an output signal Vo. The detection circuit 55 includes a detection signal amplifier 61, a capacitive element 62, and a reset switch 63. The detection circuit 55 is not limited thereto and may further include an A/D conversion circuit (not illustrated) or the like that converts an analog signal output from the detection signal amplifier 61 into a digital signal. In FIG. 7, the LC circuit 35 of the input support device 3 includes a resistor element 36 coupled in series to the capacitor 33. The resistor element 36 may however not be provided.

Figure 8:
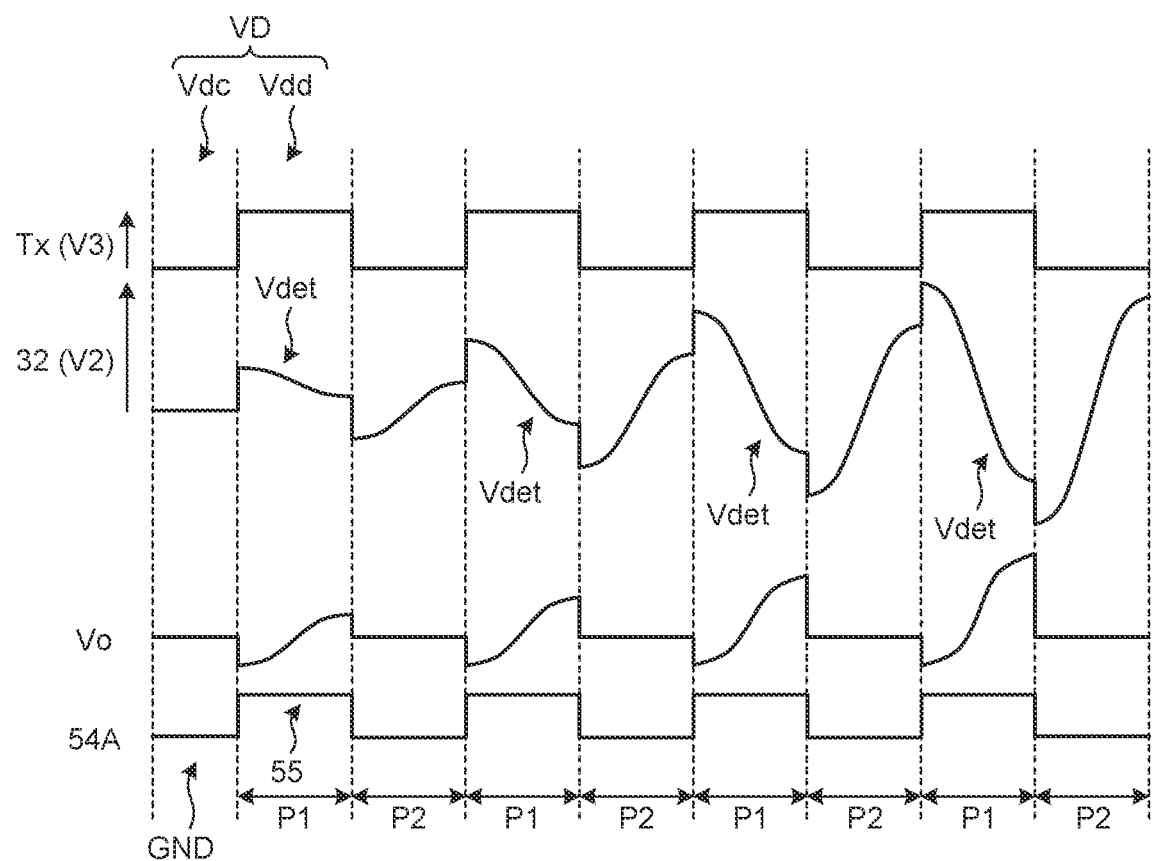
FIG. 8 is a timing waveform chart for explaining the method for detecting the input support device.

As illustrated in FIG. 7 and FIG. 8, the detection drive signal VD with AC rectangular waves is supplied to the other drive electrode Tx by an operation of the switch element 54B. As the detection drive signal VD, the power supply potential Vdd at a high level potential and the reference potential Vdc at a low level potential are alternately applied repeatedly at a predetermined frequency. A potential V3 of the other drive electrode Tx varies in accordance with the detection drive signal VD. Periods that are repeated in synchronization with the detection drive signal VD are a first period P1 and a second period P2. The first period P1 is a period in which the other drive electrode Tx is coupled to the power supply potential Vdd. The second period P2 in a period in which the other drive electrode Tx is coupled to the reference potential Vdc. The power supply potential Vdd is higher than the reference potential Vdc, for example.

The detection electrode Rx outputs the detection signals Vdet based on the mutual electrostatic capacitance Cm. To be specific, one drive electrode Tx is coupled to the reference potential (for example, the reference potential Vdc), as described above. Signals at different potentials are thereby supplied to the first electrode 31 and the second electrode 32 in the first period P1. The detection electrode Rx is coupled to the detection circuit 55 with a switching operation of the switch element 54A in the first period P1. With this configuration, variation in a potential V2 based on the mutual electrostatic capacitance Cm is output, as the detection signals Vdet, to the detection circuit 55 from the detection electrode Rx.

The detection signal amplifier 61 of the detection circuit 55 amplifies the detection signals Vdet supplied from the detection electrode Rx. A reference voltage having a fixed potential is input to a non-inverting input portion of the detection signal amplifier 61, and the detection electrode Rx is coupled to an inverting input terminal. A signal that is the same as that to one drive electrode Tx is input as the reference voltage in the present embodiment. The detection circuit 55 can reset charges of the capacitive element 62 by turning the reset switch 63 ON.

The detection drive signal VD has the same frequency as the resonant frequency of the LC circuit 35. Therefore, the second electrode 32 overlapping with the other drive electrode Tx is also driven at the resonant frequency, so that resonance of the LC circuit 35 is generated. With this configuration, the amplitudes of the detection signals Vdet are thereby increased as the first period P1 and the second period P2 are repeated. As illustrated in FIG. 8, the amplitudes of the detection signals Vdet are increased and the potential of the output signal Vo from the detection circuit 55 varies to be increased as the first period P1 is repeated a plurality of number of times.

On the other hand, when the detection target such as the finger Fg different from the input support device 3 comes into contact with or close to the upper surface 111a (refer to FIG. 1), the detection signals Vdet vary in accordance with the change in the mutual electrostatic capacitance Cm. That is to say, since no resonance is generated in the case of the finger Fg or the like, change in the amplitudes of the detection signals Vdet over time as illustrated in FIG. 8 does not occur. The input detection system 1 can thus determine whether the detection target is the finger Fg or the input support device 3 using the LC resonance of the LC circuit 35.

The width of the drive electrode Tx is smaller than the first distance r1 and the second distance r2 (refer to FIG. 6) between the first electrode 31 and the second electrode 32. With this configuration, the first electrode 31 and the second electrode 32 are thereby arranged so as to overlap with different drive electrodes Tx. The reference potential Vdc is supplied to the drive electrode Tx (one drive electrode Tx) overlapping with the first electrode 31, and the detection drive signal VD is supplied to the drive electrode Tx (the other drive electrode Tx) overlapping with the second electrode 32. As a result, the second electrode 32 can increase the amplitudes of the detection signals Vdet using the resonance of the LC circuit 35.

The drive signal supply circuit 56 may supply the detection drive signal VD to the adjacent drive electrodes Tx simultaneously to drive each drive electrode block formed by the adjacent drive electrodes Tx. In this case, the width of the drive electrode block is smaller than the first distance r1 and the second distance r2 (refer to FIG. 6) between the first electrode 31 and the second electrode 32.

Figure 9:
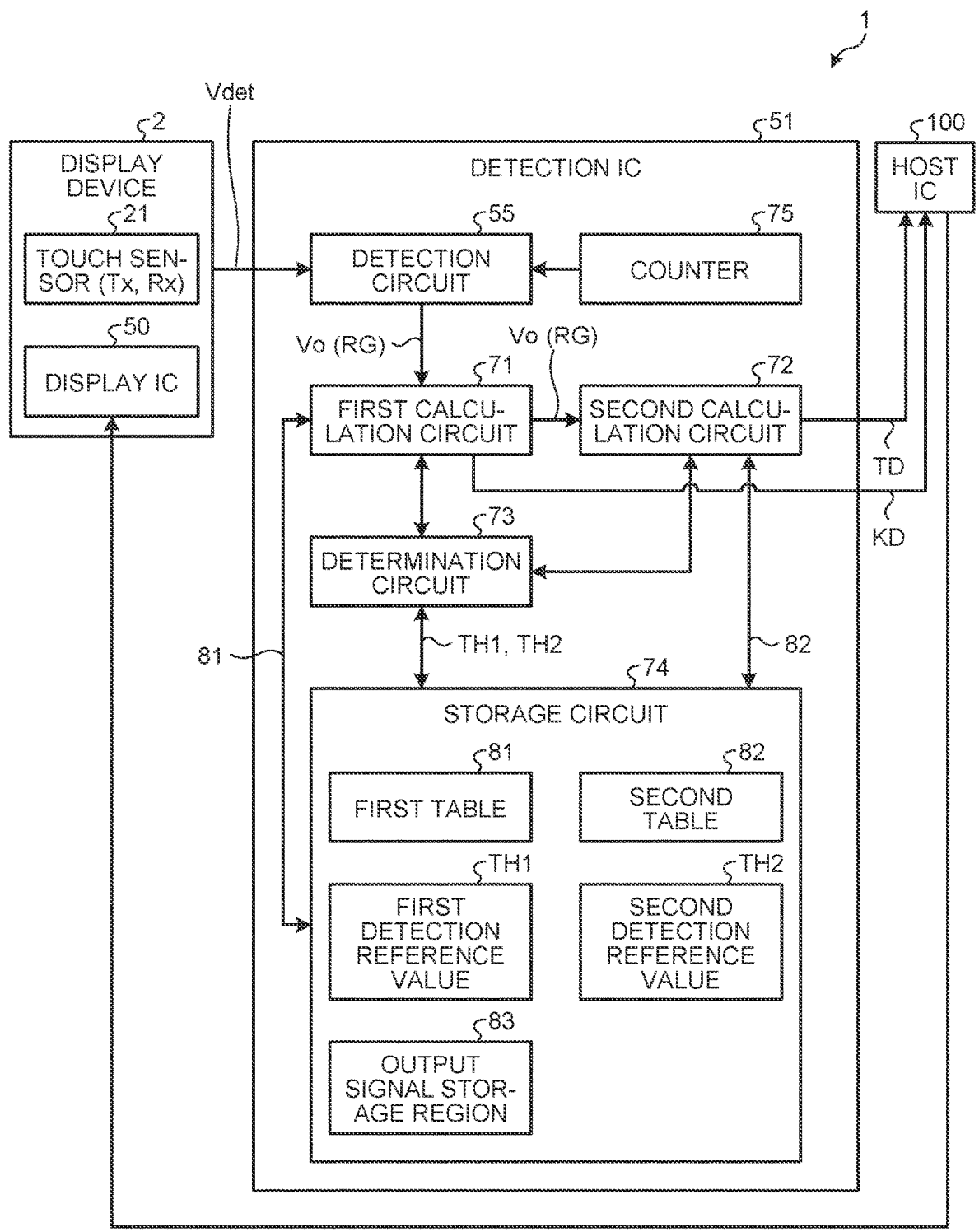
FIG. 9 is a block diagram schematically illustrating an example of the configuration of a detection IC.

Next, a method for detecting the detection target such as the input support device 3 and the finger Fg different from the input support device 3 in the input detection system 1 will be described. FIG. 9 is a block diagram schematically illustrating an example of the configuration of the detection IC. As illustrated in FIG. 9, the detection IC 51 detects the detection target such as the input support device 3 and the finger Fg different from the input support device 3 based on the detection signals Vdet received from the display device 2 (touch sensor 21). The detection IC 51 calculates at least one of touch detection information TD and input support device detection information KD in response to a detection result and outputs it to a host IC 100.

The host IC 100 is a circuit configured to control the display device 2. The host IC 100 outputs, to the display device 2, an instruction to execute an operation in accordance with an input operation based on the touch detection information TD and the input support device detection information KD. The detection IC 51 is controlled to operate in synchronization with the display IC 50 based on a control signal from the host IC 100.

The detection IC 51 includes the detection circuit 55, a first calculation circuit 71, a second calculation circuit 72, a determination circuit 73, a storage circuit 74, and a counter 75. The detection circuit 55 is a circuit configured to receive the detection signals Vdet from the display device 2 (touch sensor 21) and perform signal processing thereon. The detection circuit 55 outputs the output signal Vo containing a plurality of detection values $R_1, R_2, R_3, \ldots$, and $R_{2n}$(refer to FIG. 10 and FIG. 11). To be specific, the detection values $R_1, R_2, R_3, \ldots$, and $R_{2n}$ are pieces of data provided by sampling from an analog signal output from the detection signal amplifier 61 at timing in synchronization with the detection drive signal VD. In the following explanation, when the detection values $R_1, R_2, R_3, \ldots$, and Ren need not to be distinguished from each other for explanation, they can be referred to as detection values RG simply.

The touch sensor 21 is an electrostatic capacitance sensor formed by at least the drive electrodes Tx and the detection electrodes Rx. The touch sensor 21 is formed integrally with the display device 2 and shares some of the substrates and electrodes of the display device 2. The touch sensor 21 is however not limited to have the above-mentioned configuration and may be configured such that the drive electrodes Tx and the detection electrodes Rx are provided on a substrate as a separate member from the display device 2.

The first calculation circuit 71 detects the input support device 3 based on the output signal Vo output from the detection circuit 55. The second calculation circuit 72 detects the detection target such as the finger Fg different from the input support device 3 based on the output signal Vo output from the detection circuit 55.

The detection circuit 55 is coupled to the first calculation circuit 71, and the output signal Vo is output from the detection circuit 55 to the first calculation circuit 71. The first calculation circuit 71 is coupled to the second calculation circuit 72, and the output signal Vo is output from the first calculation circuit 71 to the second calculation circuit 72. In other words, the detection circuit 55, the first calculation circuit 71, and the second calculation circuit 72 are serially coupled in this order and sequentially perform detection of the input support device 3 and, for example, detection of the detection target such as the finger Fg based on the same output signal Vo. The coupling order of the first calculation circuit 71 and the second calculation circuit 72 may be reversed.

The first calculation circuit 71 can calculate positional information of the input support device 3 and information related to operations of the input support device 3 such as the rotation operation RT of the input support device 3 in addition to information about presence or absence of the input support device 3 as the input support device detection information KD. The second calculation circuit 72 can calculate positional information of the detection target such as the finger Fg and information related to operations of the detection target such as the finger Fg in addition to information about presence or absence of the detection target such as the finger Fg as the touch detection information TD.

The first calculation circuit 71 and the second calculation circuit 72, for example, may determine which of the detection target has been detected, such as the finger Fg and the input support device 3, by comparing a detection pattern of the detection target and information previously stored in the storage circuit 74. The detection pattern may be a shape of the detection target such as the finger Fg and the input support device 3, a detection intensity or the like in accordance with the shape. The first calculation circuit 71 and the second calculation circuit 72 may have a function of determining a type (for example, the input support device 3, 3A, 3B, or 3C (refer to FIG. 1)) of the detection target in accordance with the above-mentioned detection pattern.

The first calculation circuit 71 may include a coordinate calculation circuit and a signal processing circuit in accordance with information contained in the input support device detection information KD. The first calculation circuit 71 may output a differential value VN (refer to FIG. 10) as the input support device detection information KD. In this case, an external circuit such as the host IC 100 may calculate the positional information of the input support device 3 and the information related to the operations of the input support device 3 such as the rotation operation RT of the input support device 3.

Similarly, the second calculation circuit 72 may include a coordinate calculation circuit and a signal processing circuit in accordance with information necessary for the touch detection information TD. The second calculation circuit 72 may output an addition value VT (refer to FIG. 11) as the touch detection information TD. In this case, an external circuit such as the host IC 100 may calculate the positional information of the detection target such as the finger Fg and the information related to the operations of the detection target such as the finger Fg. Detail operation examples of the first calculation circuit 71 and the second calculation circuit 72 will be described later with reference to FIGS. 10 and 11.

The determination circuit 73 is a circuit configured to determine whether the input support device 3 is detected by comparing the differential value VN (refer to FIG. 10) calculated by the first calculation circuit 71 and a first detection reference value TH1 stored in the storage circuit 74. The determination circuit 73 is a circuit configured to determine whether touch of the detection target such as the finger Fg is detected by comparing the addition value VT (refer to FIG. 11) calculated by the second calculation circuit 72 and a second detection reference value TH2 stored in the storage circuit 74. The determination circuit 73 may be provided as two circuits so as to respectively correspond to the first calculation circuit 71 and the second calculation circuit 72 or may be incorporated in each of the first calculation circuit 71 and the second calculation circuit 72.

The storage circuit 74 is a circuit configured to store therein a first table 81, a second table 82, the first detection reference value TH1, and the second detection reference value TH2. The first table 81 is information related to a first filter FL1 (refer to FIG. 10) including a plurality of filter values $F_1, F_2, \ldots,$ and $F_n$. The second table 82 is information related to a second filter FL2 (refer to FIG. 11) including a plurality of filter values $F_1, F_2, \ldots,$ and $F_n$. The first detection reference value TH1 is a reference value (threshold) for determining whether the input support device 3 is detected. The second detection reference value TH2 is a reference value (threshold) for determining whether touch of the detection target such as the finger Fg is detected. The storage circuit 74 includes an output signal storage region 83 for temporarily storing the output signal Vo containing the detection values RG.

The counter 75 is a circuit configured to measure the number of detection values $R_1, R_2, R_3, \ldots,$ and $R_{2n}$ that the detection circuit 55 outputs. The first calculation circuit 71 and the second calculation circuit 72 can perform calculation by acquiring, from the output signal Vo, the necessary number (for example, for one detection frame) of detection values RG based on information from the counter 75.

Figure 10:
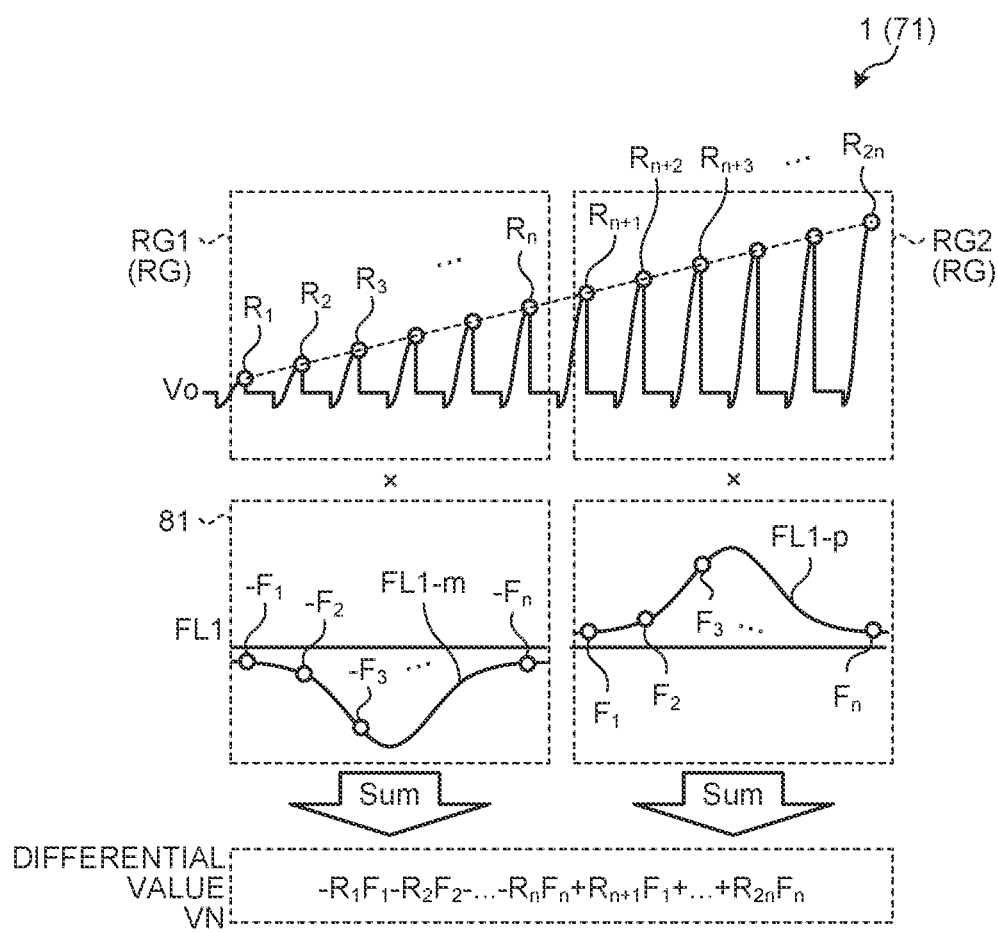
FIG. 10 is a descriptive view for explaining a calculation method of a first calculation circuit.

FIG. 10 is a descriptive view for explaining a calculation method of the first calculation circuit. As illustrated in FIG. 10, when the input support device 3 is arranged on the detection region (display region DA), the detection values $R_1, R_2, R_3, \ldots,$ and $R_{2n}$ of the output signal Vo are increased over time at each pulse of the detection drive signal VD, that is, at each predetermined period by the LC resonance of the LC circuit 35. The first calculation circuit 71 calculates the differential value VN of at least two detection values RG and detects the input support device 3 based on the differential value VN.

To be specific, the first calculation circuit 71 multiplies the detection values $R_1, R_2, R_3, \ldots,$ and $R_{2n}$ by the first filter FL1 of the first table 81 for noise elimination. The first filter FL1 is a window function and can cut out components of the detection values $R_1, R_2, R_3, \ldots,$ and $R_{2n}$ that are necessary for calculation from the detection values RG contained in the output signal Vo. The first filter FL1 includes a first filter FL1-$p$ of a positive sign and a first filter FL1-$m$ of a negative sign, the filters having different polarities. The first filter FL1-$p$ of the positive sign and the first filter FL1-$m$ of the negative sign respectively have n filter values $F_1, F_2, \ldots,$ and $F_n$ and n filter values $-F_1, -F_2, \ldots,$ and $-F_n$.

The first calculation circuit 71 multiplies detection values RG1 ($R_1, R_2, R_3, \ldots,$ and $R_n$) of a first half that are contained in the output signal Vo by the first filter FL1-$m$ of the negative sign. The first calculation circuit 71 multiplies detection values RG2 ($R_{n+1}, R_{n+2}, R_{n+3}, \ldots,$ and $R_{2n}$) of a second half that are contained in the output signal Vo by the first filter FL1-$p$ of the positive sign. When the input support device 3 is arranged, as illustrated in FIG. 10, the detection values RG2 of the second half are larger than the detection values RG1 of the first half.

The first calculation circuit 71 sums up these values to calculate the differential value $VN = -R_1F_1 - R_2F_2 \ldots -R_nF_n + R_{n+1}F_1 + R_{n+2}F_2 \ldots + R_{2n}F_n$. That is to say, the differential value VN is a value as a difference between values provided by multiplying the detection values RG2 of the second half by the first filter FL1 and values provided by multiplying the detection values RG1 of the first half by the first filter FL1.

The determination circuit 73 compares the differential value VN and the first detection reference value TH1. When the differential value VN is equal to or larger than the first detection reference value TH1, the determination circuit 73 determines that the LC resonance of the LC circuit 35 is generated, that is, the input support device 3 has been detected. On the other hand, when the differential value VN is smaller than the first detection reference value TH1, the determination circuit 73 determines that the LC resonance of the LC circuit 35 is not generated, that is, the input support device 3 has not been detected.

In this manner, the first calculation circuit 71 receives the output signal Vo containing the detection values RG and calculates the differential value VN between the sum of the detection values RG1 of the first half (the detection values RG of a first group) and the sum of the detection values RG of the second half (the detection values RG of a second group) to detect the presence or absence of the input support device 3.

The calculation method of the first calculation circuit 71 illustrated in FIG. 10 is merely an example and can be appropriately modified. For example, the first calculation circuit 71 may calculate an average value of the detection values RG1 of the first half, calculate an average value of the detection values RG2 of the second half, and multiply each of the average values by the first filter FL1.

Although the first calculation circuit 71 calculates the differential value VN using all of the detection values RG that the output signal Vo has, the calculation method is not limited thereto. The first calculation circuit 71 may reduce a range of the detection values RG1 of the first half and use m (m<n) detection values $R_1$, $R_2$, $R_3$, . . . , and $R_m$ for calculation of the differential value VN. The first calculation circuit 71 may reduce a range of the detection values RG2 of the second half and use m detection values $R_{n+1}$, $R_{n+2}$, $R_{n+3}$, . . . , and $R_n+_m$ for calculation of the differential value VN. Alternatively, the first filter FL1 having m (m<n) filter values $F_1$, $F_2$, . . . , and $F_m$ is prepared and the first calculation circuit 71 may multiply the detection values RG1 of the first half and the detection values RG2 of the second half by the first filter FL1. (n–m) detection values RG are thereby removed by the filter processing and are not contained in the differential value VN. In this case, a signal value of the differential value VN can be increased.

In the example illustrated in FIG. 10, each of the number of detection values RG1 of the first half and the number of detection values RG2 of the second half is the half of the number of all of the detection values RG that the output signal Vo has. The number is however not limited thereto. The first calculation circuit 71 may enlarge the range of the detection values RG1 of the first half and enlarge the range of the detection values RG2 of the second half for calculation of the differential value VN. That is to say, some detection values RG (for example, the detection values RG in a center part in the vicinity of the detection values RG and $R_{n+1}$) may be contained in both of the detection values RG1 of the first half and the detection values RG2 of the second half. The detection values RG of (t–n) detection values in the center part are multiplied by both of the first filter FL1-$m$ of the negative sign and the first filter FL1-$p$ of the positive sign by preparing the first filter FL1 having t (n<t) filter values $F_1$, $F_2$, . . . , and $F_t$ and multiplying the detection values RG by it, for example. In this case, noise of the differential value VN can be reduced.

Figure 11:
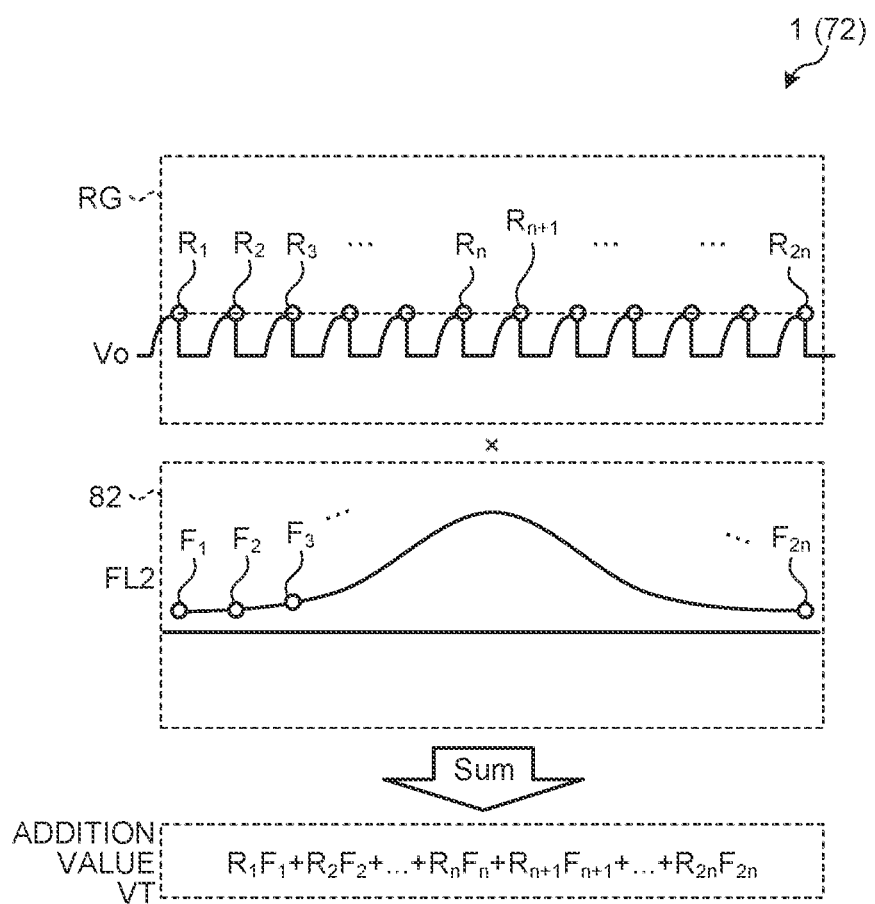
FIG. 11 is a descriptive view for explaining a calculation method of a second calculation circuit.

FIG. 11 is a descriptive view for explaining a calculation method of the second calculation circuit. As illustrated in FIG. 11, when the detection target such as the finger Fg different from the input support device 3 comes into contact with or close to the detection region (display region DA), the LC resonance is not generated. Therefore, the detection values $R_1$, $R_2$, $R_3$, . . . , and $R_{2n}$ of the output signal Vo do not vary at each pulse of the detection drive signal VD but vary in accordance with the mutual electrostatic capacitance Cm (refer to FIG. 7) with the presence of the detection target such as the finger Fg. FIG. 11 illustrates an example of a state in which the detection values $R_1$, $R_2$, $R_3$, . . . , and $R_{2n}$ are constant, that is, the detection target such as the finger Fg comes into contact with the detection region and is fixed.

The second calculation circuit 72 calculates the addition value VT of at least two detection values RG and detects the detection target such as the finger Fg different from the input support device 3 based on the addition value VT. To be specific, the first calculation circuit 71 multiplies the detection values $R_1$, $R_2$, $R_3$, . . . , and $R_{2n}$ by the second filter FL2 of the second table 82 for noise elimination. The second filter FL2 is a window function and can cut out components of the detection values $R_1$, $R_2$, $R_3$, . . . , and $R_{2n}$ that are necessary for calculation from the detection values RG contained in the output signal Vo. The second filter FL2 contains 2n filter values $F_1$, $F_2$, $F_3$, . . . , and $F_{2n}$. That is to say, the second filter FL2 is provided so as to correspond to all of the detection values RG of the output signal Vo. In the present embodiment, the number of filter values that the second filter FL2 has is larger than the number of filter values that the first filter FL1 has.

The second calculation circuit 72 sums up values provided by performing the filter processing to calculate the addition value VT=$R_1F_1+R_2F_2$ . . . +$R_nF_n+R_{n+1}F_{n+1}+R_{n+2}F_{n+2}$ . . . +$R_{2n}F_{2n}$. That is to say, the addition value VT is a value provided by summing up values obtained by multiplying the detection values RG by the second filter FL2.

The determination circuit 73 compares the addition value VT and the second detection reference value TH2 (that is also referred to as a baseline). When the addition value VT is equal to or larger than the second detection reference value TH2, the determination circuit 73 determines that the finger FG comes into contact with or close to the detection region, that is, touch of the finger Fg is detected. On the other hand, when the addition value VT is smaller than the second detection reference value TH2, the determination circuit 73 determines that the finger Fg does not come into contact with the detection region, that is, touch of the finger Fg is not detected.

The calculation method of the second calculation circuit 72 illustrated in FIG. 11 is merely an example and can be appropriately modified. For example, the second calculation circuit 72 may calculate an average value of the detection values RG. The second calculation circuit 72 may sum up some detection values RG of the output signal Vo to calculate the addition value VT. For example, the second calculation circuit 72 may prepare the second filter FL2 having m (m<2n) filter values $F_1$, $F_2$, . . . , and $F_m$ and multiply the second filter FL2 by the detection values RG. (2n–m) detection values RG are thereby removed by the filter processing and are not added to the addition value VT.

Figure 12:
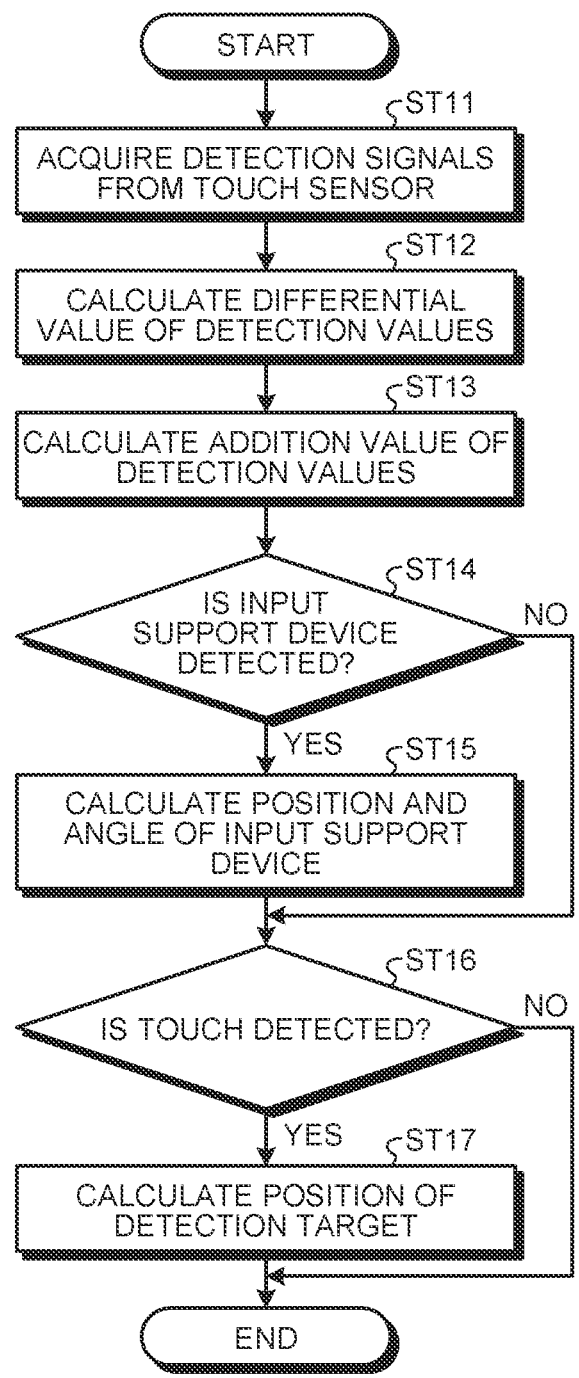
FIG. 12 is a flowchart for explaining a detection method in the input detection system.

Next, a detection method in the input detection system will be described with reference to FIG. 9 to FIG. 12. FIG. 12 is a flowchart for explaining the detection method in the input detection system. The detection circuit 55 acquires the detection signals Vdet from the touch sensor (step ST110). The detection circuit 55 performs signal processing on the detection signals Vdet and outputs the output signal Vo containing the detection values RG to the first calculation circuit 71.

Then, the first calculation circuit 71 calculates the differential value VN of the detection values RG based on the output signal Vo received from the detection circuit 55 and the first table 81 received from the storage circuit 74 as described with reference to FIG. 10 (step ST12). The first calculation circuit 71 outputs the output signal Vo containing the detection values RG to the second calculation circuit 72.

Subsequently, the second calculation circuit 72 calculates the addition value VT of the detection values RG based on the output signal Vo received from the first calculation circuit 71 and the second table 82 received from the storage circuit 74 as described with reference to FIG. 11 (step ST13).

The determination circuit 73 determines whether the input support device 3 is detected (step ST14). To be specific, the determination circuit 73 compares the differential value VN received from the first calculation circuit 71 and the first detection reference value TH1 received from the storage circuit 74. When the differential value VN is equal to or larger than the first detection reference value TH1, that is, when the input support device 3 is detected (Yes at step ST14), the first calculation circuit 71 calculates the position of the input support device 3 and the angle (rotation operation RT) of the input support device 3 (step ST15). The first calculation circuit 71 may output, to the second calculation circuit 72, an instruction not to execute detection of the detection target such as the finger Fg at the position at which the input support device 3 is detected.

When the differential value VN is smaller than the first detection reference value TH1, that is, when the input support device 3 is not detected (No at step ST14), the first calculation circuit 71 omits calculation of information related to the input support device 3.

Then, the determination circuit 73 determines whether touch of the detection target such as the finger Fg is detected (step ST16). To be specific, the determination circuit 73 compares the addition value VT received from the second calculation circuit 72 and the second detection reference value TH2 received from the storage circuit 74. When the addition value VT is equal to or larger than the second detection reference value TH2, that is, when touch of the detection target such as the finger Fg is detected (Yes at step ST16), the second calculation circuit 72 calculates the position of the detection target such as the finger Fg (step ST17).

When the addition value VT is smaller than the second detection reference value TH2, that is, when touch of the detection target such as the finger Fg is not detected (No at step ST16), the second calculation circuit 72 omits the position of the detection target such as the finger Fg. The first calculation circuit 71 and the second calculation circuit 72 output calculation results (the input support device detection information KD and the touch detection information TD) to the host IC 100 and finish detection for one frame.

The detection method illustrated in FIG. 12 is merely an example and can be appropriately modified. For example, the order of step ST12 and step ST13 may be reversed. In this case, the detection circuit 55, the second calculation circuit 72, and the first calculation circuit 71 are serially coupled in this order. That is to say, the second calculation circuit 72 may receive the output signal Vo from the detection circuit 55, and the first calculation circuit 71 may receive the output signal Vo from the second calculation circuit 72. The order of steps ST14 and ST15 and steps ST16 and ST17 may also be reversed.

As described above, the input detection system 1 includes the electrodes (the drive electrodes Tx and the detection electrodes Rx) aligned in the detection region (display region DA), the drive signal supply circuit 56 configured to supply the detection drive signal VD to the electrodes (drive electrodes Tx), the detection circuit 55 configured to detect the signals (detection signals Vdet) from the electrodes (detection electrodes Rx), the input support device 3 including the LC circuit 35 and the first electrode 31 and the second electrode 32 coupled to the LC circuit 35 and arranged so as to overlap with each of the electrodes (drive electrodes Tx), the first calculation circuit 71 configured to detect the input support device 3 based on the output signal Vo output from the detection circuit 55, and the second calculation circuit 72 configured to detect the detection target different from the input support device 3 based on the output signal Vo.

The detection circuit 55 is coupled to the first calculation circuit 71, the first calculation circuit 71 is coupled to the second calculation circuit 72, and the output signal Vo is output from the detection circuit 55 to the first calculation circuit 71 and is output from the first calculation circuit 71 to the second calculation circuit 72.

With this configuration, the input detection system 1 can detect the input support device 3 and the detection target such as the finger Fg different from the input support device 3 respectively by the first calculation circuit 71 and the second calculation circuit 72 based on the common output signal Vo. That is to say, the drive signal supply circuit 56 can drive using the detection drive signal VD at a constant frequency and does not need to distinguish the frequency of the detection drive signal VD into the resonant frequency of the LC circuit 35 and a non-resonant frequency depending on the types of the detection targets, for driving.

Accordingly, the input detection system 1 can reduce time required for detection for one detection frame in comparison with driving in which the frequency of the detection drive signal VD is changed for each detection target. In other words, the input detection system 1 can prevent a detection report rate from being lowered in comparison with the driving in which the frequency of the detection drive signal VD is changed for each detection target. The detection report rate is a frequency at which one detection frame for scanning the drive electrodes Tx in the overall detection region is repeatedly executed.

Second Embodiment

Figure 13:
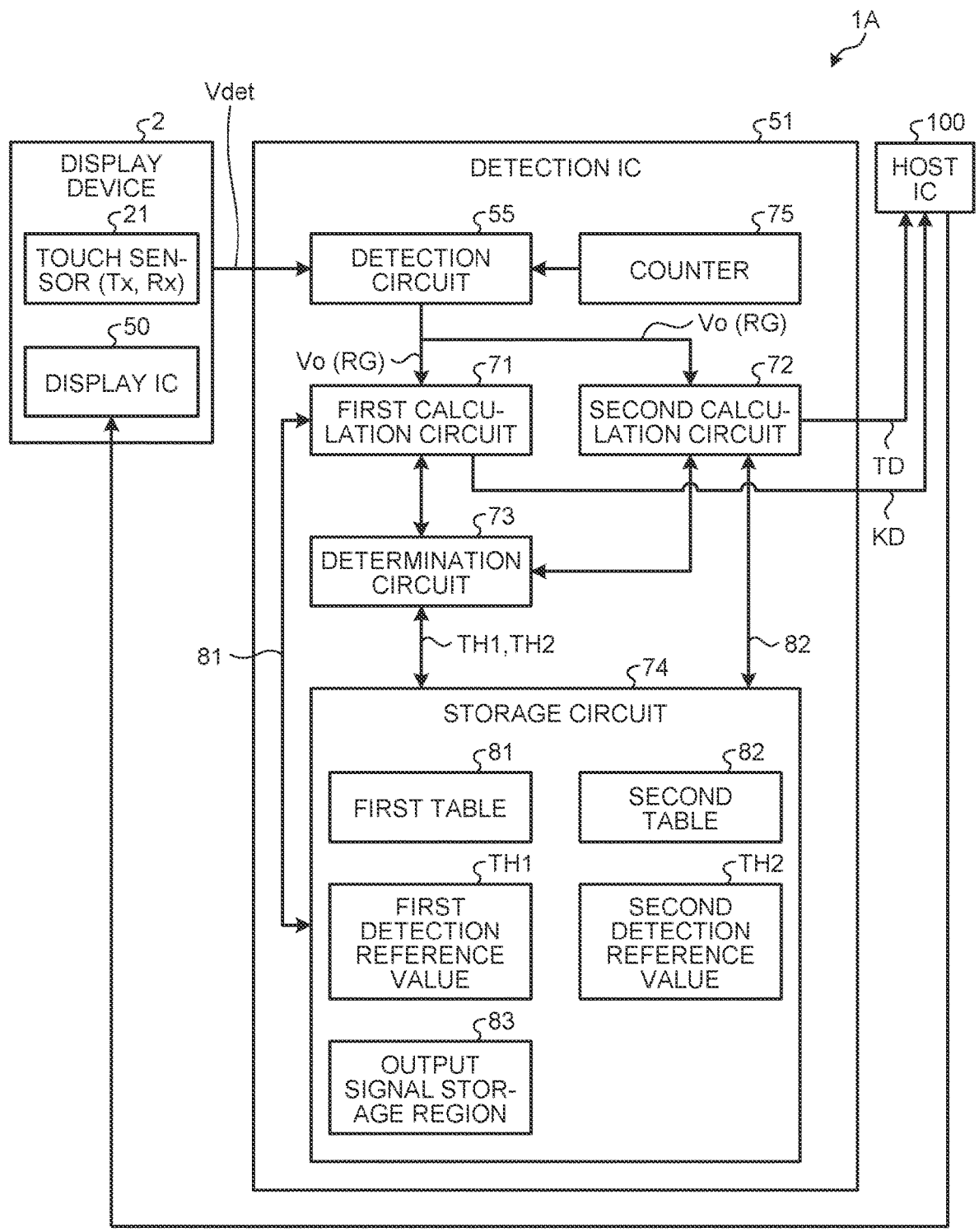
FIG. 13 is a block diagram schematically illustrating an example of the configuration of a detection IC in an input detection system according to a second embodiment.

FIG. 13 is a block diagram schematically illustrating an example of the configuration of a detection IC in an input detection system according to a second embodiment. In the following explanation, the same reference numerals denote the same components described in the above-mentioned embodiment and overlapped explanation thereof is omitted.

Although the detection circuit 55, the first calculation circuit 71, and the second calculation circuit 72 are serially coupled in the above-mentioned first embodiment, they are not limited to be coupled in this manner. As illustrated in FIG. 13, in an input detection system 1A in the second embodiment, the first calculation circuit 71 and the second calculation circuit 72 are coupled in parallel to the detection circuit 55. The detection circuit 55 is coupled to the first calculation circuit 71 and the second calculation circuit 72, and the output signal Vo is output from the detection circuit 55 to each of the first calculation circuit 71 and the second calculation circuit 72.

Figure 14:
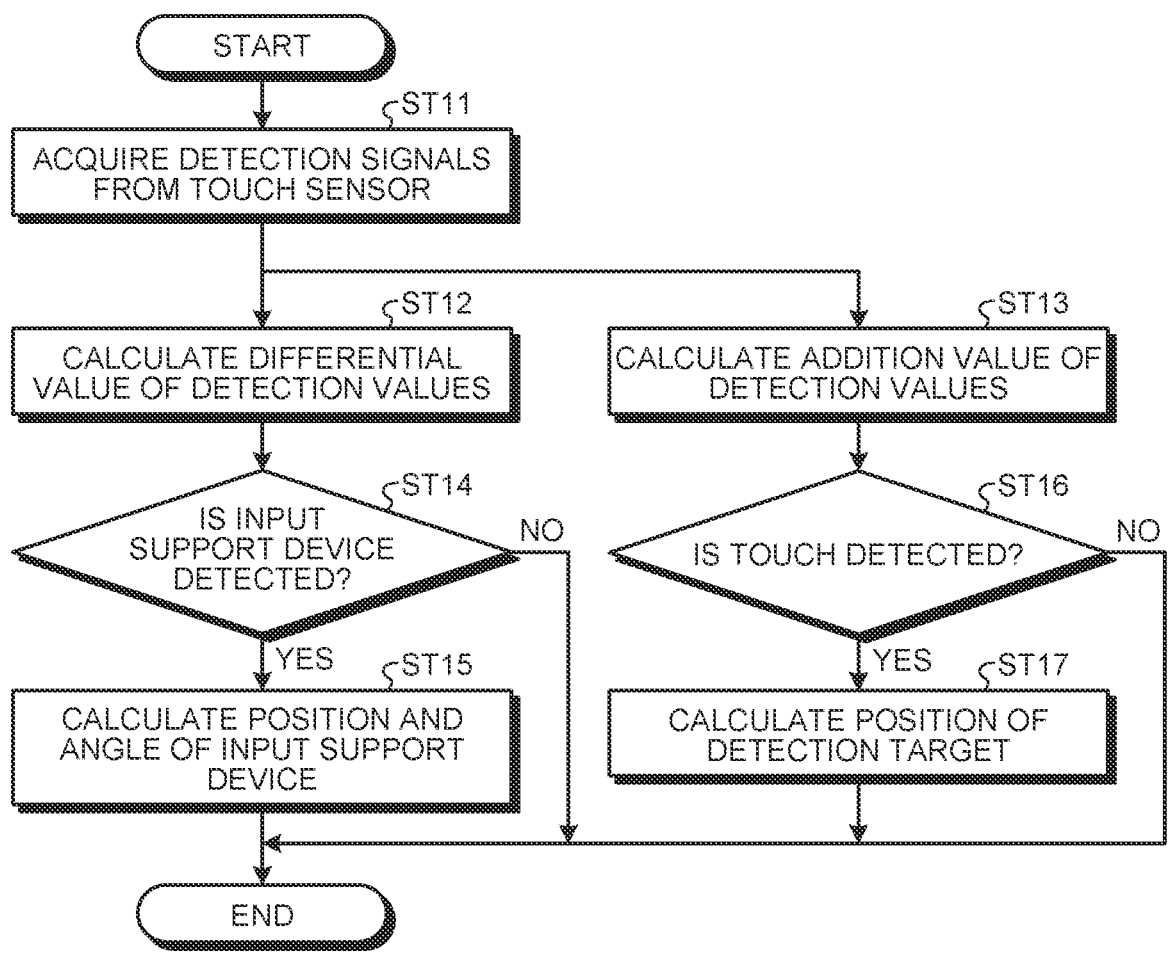
FIG. 14 is a flowchart for explaining a detection method in the input detection system according to the second embodiment.

FIG. 14 is a flowchart for explaining a detection method in the input detection system according to the second embodiment. Step ST11 to step ST17 illustrated in FIG. 14 are similar to step ST11 to step ST17 illustrated in FIG. 12.

As illustrated in FIG. 14, the first calculation circuit 71 and the determination circuit 73 execute steps ST12, ST14, and ST15 to detect the input support device 3 based on the output signal Vo received from the detection circuit 55. Concurrently therewith, the second calculation circuit 72 and the determination circuit 73 execute steps ST13, ST16, and ST17 to detect the detection target such as the finger Fg based on the output signal Vo received from the detection circuit 55.

Steps ST12, ST14, and ST15 and steps ST13, ST16, and ST17 are not limited to be performed independently from each other and may be performed while mutually transferring information if necessary. For example, the first calculation circuit 71 may transmit information such as the position of the input support device 3 to the second calculation circuit 72 similarly to the first embodiment. Alternatively, the second calculation circuit 72 may transmit positional information of the detection target such as the finger Fg to the first calculation circuit 71.

As described above, in the second embodiment, the first calculation circuit 71 and the second calculation circuit 72 can execute the calculation described above with reference to FIG. 10 and FIG. 11 in parallel based on the common output signal Vo. Accordingly, in the input detection system 1A in the second embodiment, time required for detection of the input support device 3 and detection of the detection target such as the finger Fg can be reduced in comparison with that in the first embodiment.

Third Embodiment

Figure 15:
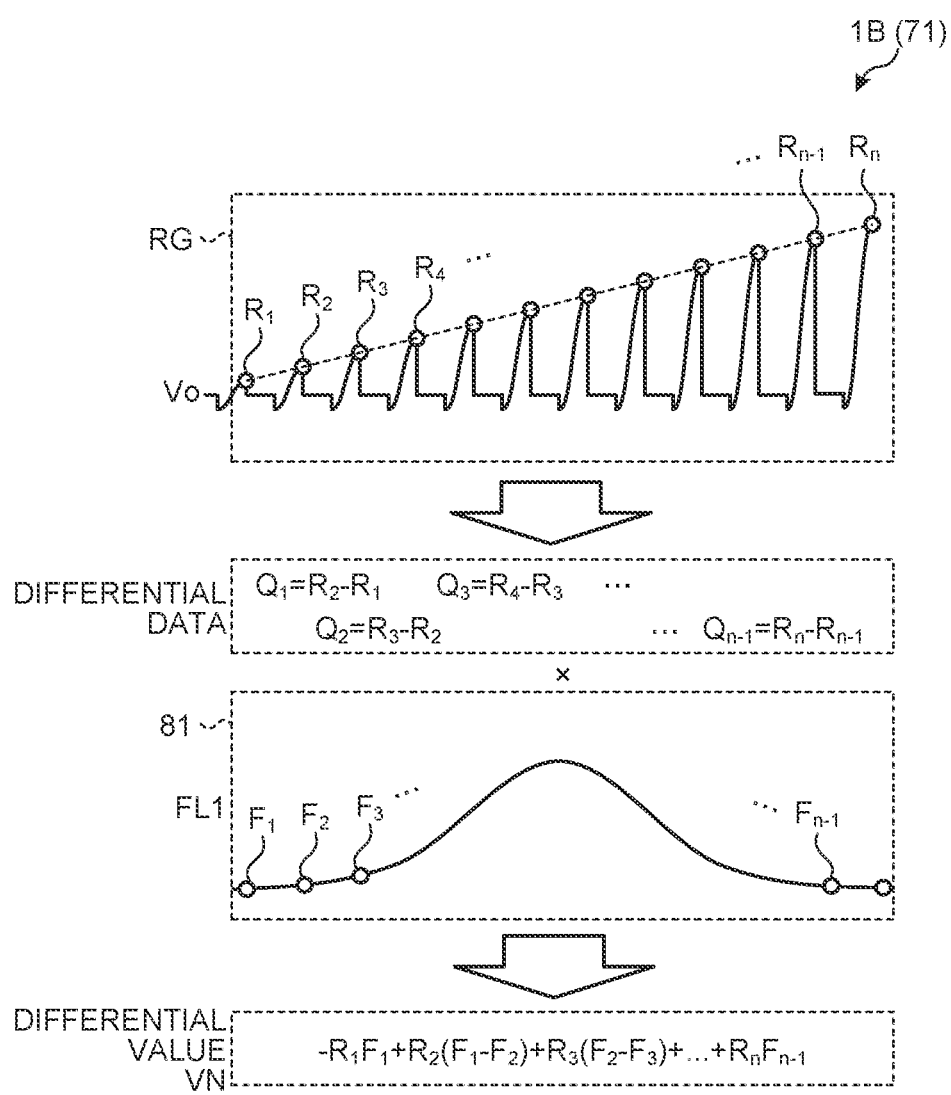
FIG. 15 is a descriptive view for explaining a calculation method of a first calculation circuit in an input detection system according to a third embodiment.

FIG. 15 is a descriptive view for explaining a calculation method of a first calculation circuit in an input detection system according to a third embodiment. In the above-mentioned first embodiment, the first calculation circuit 71 calculates the differential value VN of the detection values RG using the first filter FL1-$p$ of the positive sign and the first filter FL1-$m$ of the negative sign. The calculation method is however not limited thereto.

As illustrated in FIG. 15, in an input detection system 1B according to the third embodiment, the first calculation circuit 71 receives the first table 81 containing one first filter FL1 from the storage circuit 74. Each of the filter values $F_1$, $F_2$, . . . , and $F_n$ that the first filter FL1 has is values having the same polarity (positive sign).

The first calculation circuit 71 calculates pieces of differential data $Q_1, Q_2, Q_3, \ldots$, and $Q_{n-1}$ obtained by differentiating two detection values RG. In the example illustrated in FIG. 15, the pieces of differential data $Q_1, Q_2, Q_3, \ldots$, and $Q_{n-1}$ are values obtained by differentiating the two adjacent detection values RG. The pieces of differential data $Q_1, Q_2, Q_3, \ldots$, and $Q_{n-1}$ are provided by calculation using different combinations of the detection values RG. To be specific, the differential data $Q_1$ is expressed by $Q_1=R_2-R_1$. Similarly, the differential data $Q_2$ is expressed by $Q_2=R_3-R_2$, the differential data $Q_3$ is expressed by $Q_3=R_4-R_3$, and the differential data $Q_{n-1}$ is expressed by $Q_{n-1}=R_n-R_{n-1}$. The number of pieces of differential data $Q_1, Q_2, Q_3, \ldots$, and $Q_{n-1}$ is smaller than the number of detection values RG and is, for example, (n−1).

The first calculation circuit 71 multiplies the pieces of differential data $Q_1, Q_2, Q_3, \ldots$, and $Q_{n-1}$ by the first filter FL1 (the filter values $F_1, F_2, \ldots$, and $F_{n-1}$) of the first table 81. The number of filter values $F_1, F_2$, and $F_{n-1}$ is (n−1). The first calculation circuit 71 sums up these values to calculate the differential value $VN=-R_1F_1+R_2 (F_1-F_2)+R_3 (F_2-F_3)+ \ldots +R_nF_{n-1}$.

In the present embodiment, each of the pieces of differential data $Q_1, Q_2, Q_3, \ldots$, and $Q_{n-1}$ is a differential of the adjacent detection values RG at an equal interval therebetween and can be regarded as expressing an inclination of the detection values RG. That is to say, when the inclination of the detection values RG is larger than a predetermined reference value, the determination circuit 73 can determine that the input support device 3 is detected. When the inclination of the detection values RG is smaller than the predetermined reference value, the determination circuit 73 can determine that the input support device 3 is not detected.

Alternatively, the first calculation circuit 71 calculates a value VN1 ($=R_1F_1+R_2F_2+R_3F_3 \ldots +R_{n-1}F_{n-1}$) by multiplying (n−1) detection values $R_1, R_2, R_3, \ldots$, and $R_{n-1}$ that do not include the detection value $R_n$ by the filter values $F_1, F_2, \ldots$, and $F_{n-1}$. The first calculation circuit 71 calculates a value VN2 ($=R_2F_1+R_3F_2+R_4F_3 \ldots +R_nF_{n-1}$) by multiplying (n−1) detection values $R_2, R_3, R_4, \ldots$, and $R_n$ that do not include the detection value $R_1$ by the filter values $F_1, F_2, \ldots$, and $F_{n-1}$. A differential (VN2-VN1) between the value VN1 and the value VN2 is equivalent to the differential value VN based on the pieces of differential data $Q_1, Q_2, Q_3f \ldots$, and $Q_{n-1}$ illustrated in FIG. 15. In other words, the differential is equivalent to the case where the detection values $R_1, R_2, R_3, \ldots$, and $R_{n-1}$ are selected as the detection values RG1 of the first half and $R_2, R_3, R_4, \ldots$, and $R_n$ are selected as the detection values RG2 of the second half in the first embodiment (FIG. 10).

In the present embodiment, the first calculation circuit 71 can calculate the differential value VN with one first filter FL1 in comparison with the above-mentioned first embodiment. The first filter FL1 can be shared with the second filter FL2 that the second calculation circuit 72 uses. That is to say, detection of the input support device 3 by the first calculation circuit 71 and detection of the detection target such as the finger Fg by the second calculation circuit 72 can be performed with one first filter FL1 (or the second filter FL2).

The calculation method of the first calculation circuit 71 in the third embodiment may be applied to the configuration in which the detection circuit 55, the first calculation circuit 71, and the second calculation circuit 72 are serially coupled in the above-mentioned first embodiment or may be applied to the configuration in which the first calculation circuit 71 and the second calculation circuit 72 are coupled in parallel in the second embodiment.

Fourth Embodiment

Figure 16:
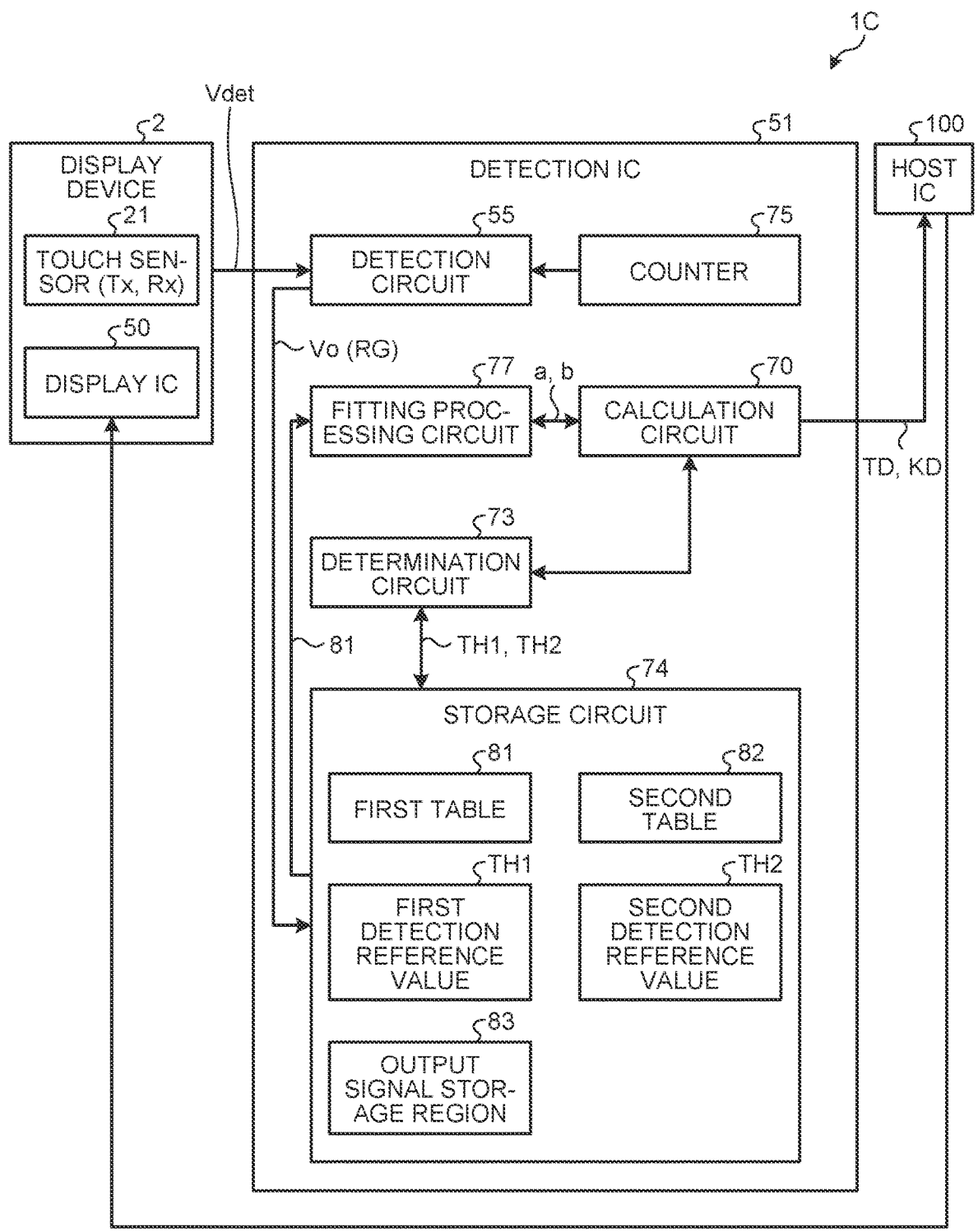
FIG. 16 is a block diagram schematically illustrating an example of the configuration of a detection IC in an input detection system according to a fourth embodiment.

FIG. 16 is a block diagram schematically illustrating an example of the configuration of a detection IC in an input detection system according to a fourth embodiment. As illustrated in FIG. 16, in an input detection system 1C according to the fourth embodiment, the detection IC 51 includes a fitting processing circuit 77. The detection IC 51 includes a calculation circuit 70 instead of the first calculation circuit 71 and the second calculation circuit 72 as described above.

The fitting processing circuit 77 is a circuit configured to calculate an approximate expression by fitting a relation between the detection values RG that the output signal Vo output from the detection circuit 55 contains and time. In the present embodiment, the detection values RG that the output signal Vo has are stored in order in the output signal storage region 83 of the storage circuit 74 from the detection circuit 55. After the predetermined number of detection values RG (for example, the detection values $R_1, R_2, R_3, \ldots$, and $R_n$) are detected, the detection values RG are output from the storage circuit 74 to the fitting processing circuit 77.

Figure 17:
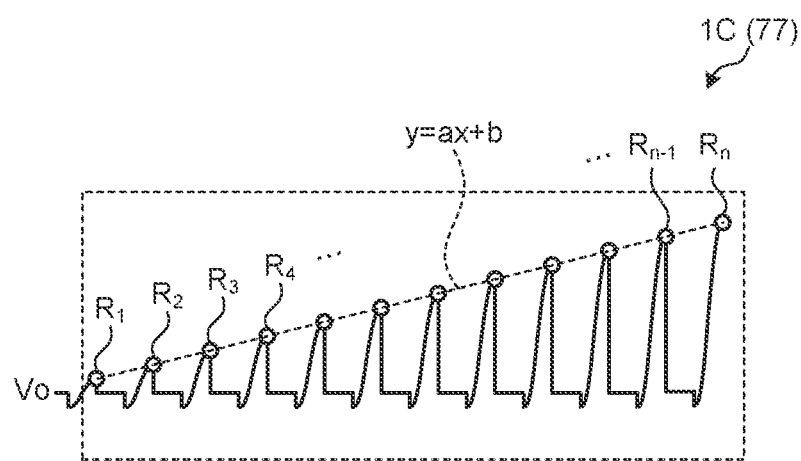
FIG. 17 is a descriptive view for explaining a calculation method of a fitting processing circuit in the input detection system according to the fourth embodiment.

FIG. 17 is a descriptive view for explaining a calculation method of the fitting processing circuit in the input detection system according to the fourth embodiment. The fitting processing circuit 77 uses the detection values RG for fitting with a linear function $y=ax+b$ by a least-squares method or the like and calculates parameters a and b as information of the approximate expression. Herein, y corresponds to a voltage value of the detection value RG and x corresponds to time. The parameter a indicates an inclination of the detection values RG in the relation between the detection values RG and time, and the parameter b indicates an intercept of the detection values RG.

The fitting processing circuit 77 outputs, to the calculation circuit 70, the parameters a and b as detection values provided by fitting to the detection values RG. The determination circuit 73 compares the parameter a and the first detection reference value TH1. When the parameter a is equal to or larger than the first detection reference value TH1, the determination circuit 73 determines that the input support device 3 is detected. On the other hand, when the parameter a is smaller than the first detection reference value TH1, the determination circuit 73 determines that the input support device 3 is not detected. That is to say, the determination circuit 73 determines whether the input support device 3 is detected based on the inclination of the detection values RG.

The determination circuit 73 compares the parameter b and the second detection reference value TH2. When the parameter b is equal to or larger than the second detection reference value TH2 and the parameter a is smaller than the first detection reference value TH1, the determination circuit 73 determines that the detection target such as the finger Fg is detected. When the parameter b is smaller than the second detection reference value TH2, the determination circuit 73 determines that the detection target such as the finger Fg is not detected. That is to say, the determination circuit 73 determines whether the detection target such as the finger Fg is detected based on the intercept of the detection values RG.

The calculation circuit 70 calculates the input support device detection information KD when the input support device 3 is detected and calculates the touch detection information TD when the detection target such as the finger Fg is detected based on the determination result by the determination circuit 73.

In the present embodiment, the input support device 3 and the detection target such as the finger Fg are respectively detected with the parameters a and b detected in the fitting processing circuit 77, as the example. The detection method is however not limited thereto, and the input support device 3 may be detected with the parameters a and b detected in the fitting processing circuit 77 and detection of the detection target such as the finger Fg may be determined by calculating the addition value VT illustrated in FIG. 11.

Fifth Embodiment

Figure 18:
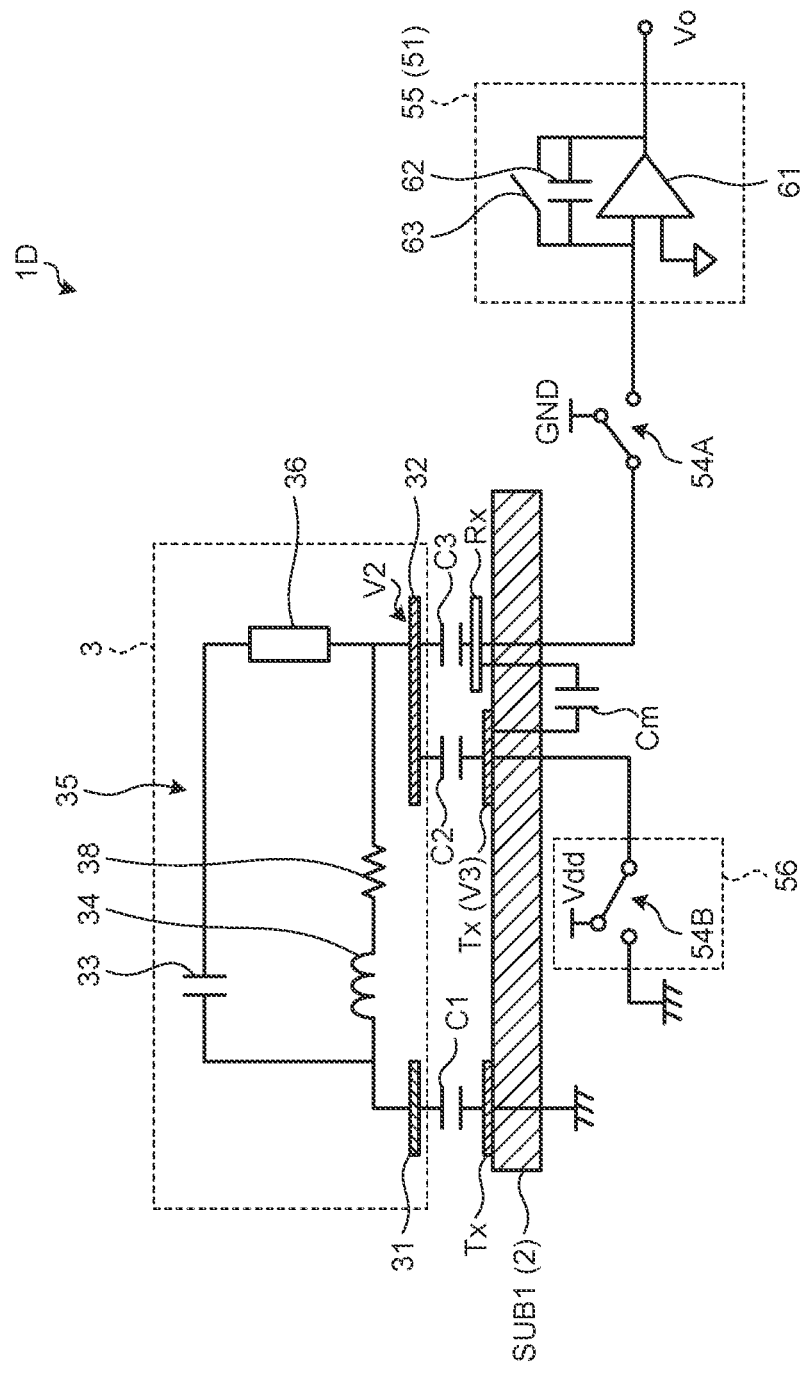
FIG. 18 is a descriptive view for explaining the configuration of an input support device according to a fifth embodiment.

FIG. 18 is a descriptive view for explaining the configuration of an input support device according to a fifth embodiment. As illustrated in FIG. 18, in an input detection system 1D according to the fifth embodiment, the configuration of the input support device 3 in which a resistor component 38 of the inductor 34 is coupled in series will be described.

Figure 19:
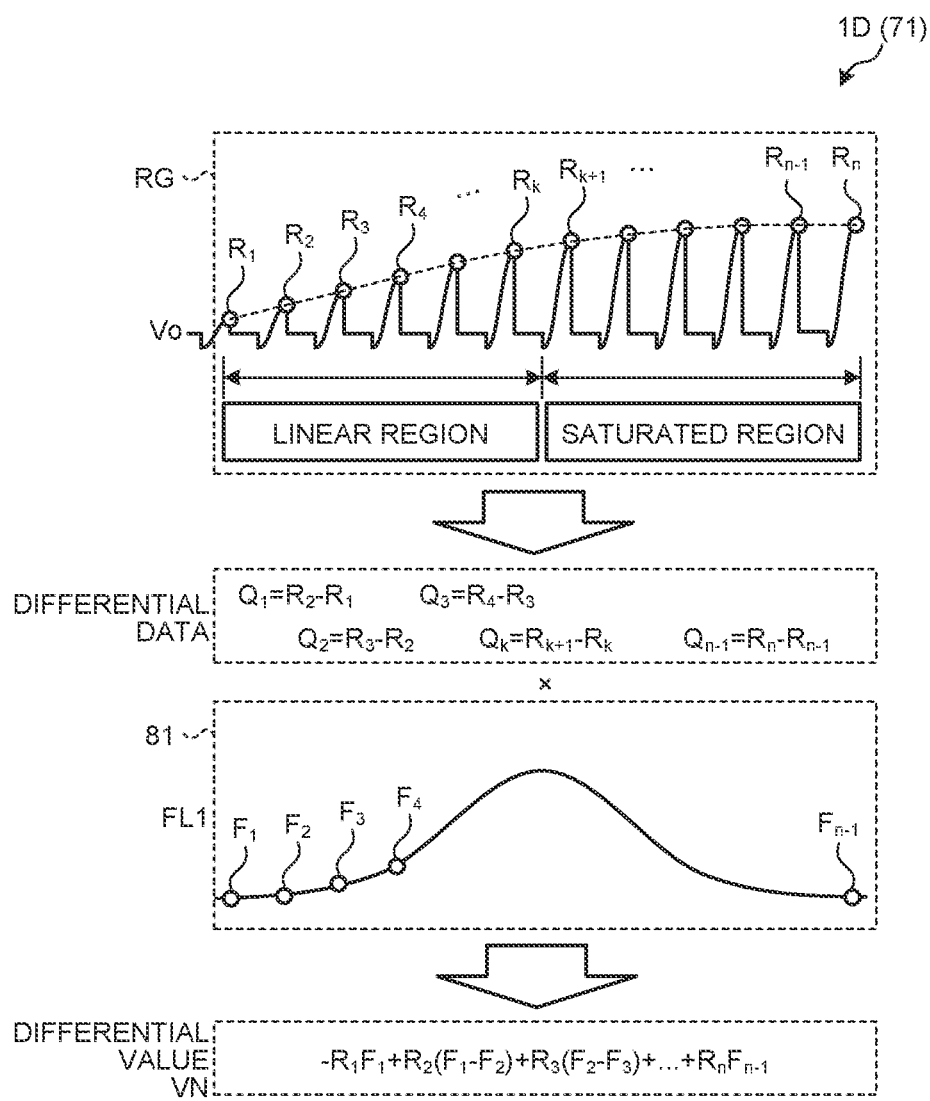
FIG. 19 is a descriptive view for explaining a calculation method of a first calculation circuit in an input detection system according to the fifth embodiment.

FIG. 19 is a descriptive view for explaining a calculation method of a first calculation circuit in the input detection system according to the fifth embodiment. As illustrated in FIG. 19, the detection values RG of the output signal Vo may be saturated with presence of the resistor component 38. The output signal Vo has a linear region in which the detection values RG vary with a first inclination and a saturated region with a second inclination smaller than the first inclination in terms of a relation between the detection values RG and time. In FIG. 19, the linear region is a region including, for example, detection values $R_1, R_2, R_3, \ldots,$ and $R_k$. The saturated region is a region including, for example, detection values $R_{k+1}, R_{k+2}, \ldots, R_{n-1},$ and $R_k$ is a natural number smaller than n. When impedance characteristics of the LC circuit 35 are known, ranges of the linear region and the saturated region may be calculated in advance and stored in the storage circuit 74.

Similarly to the above-mentioned third embodiment, the first calculation circuit 71 calculates the pieces of differential data $Q_1, Q_2, Q_3, \ldots,$ and $Q_{n-1}$ for the detection values $R_1, R_2, R_3, \ldots,$ and $R_k$ in the linear region and the detection values $R_{k+1}, R_{k+2}, \ldots, R_{n-1},$ and $R_n$ in the saturated region. The differential data $Q_1$ is expressed by $Q_1=R_2-R_1$, the differential data $Q_2$ is expressed by $Q_2=R_3-R_2$, the differential data $Q_3$ is expressed by $Q_3=R_4-R_3$, the differential data $Q_k$ is expressed by $Q_k=R_{k+1}-R_k$, the differential data $Q_{k+1}$ is expressed by $Q_{k+1}=R_{k+2}-R_{k+1}$, and $Q_{n-1}$ is expressed by $Q_{n-1}=R_n-R_{n-1}$.

The first calculation circuit 71 multiplies the pieces of differential data $Q_1, Q_2, Q_3, \ldots, Q_k, \ldots,$ and $Q_{n-1}$ by the first filter FL1 (the filter values $F_1, F_2, \ldots,$ and $F_{n-1}$) of the first table 81. The number of filter values $F_1, F_2, \ldots,$ and $F_{n-1}$ is (n−1). The first calculation circuit 71 for the detection values RG sums up these values to calculate the differential value $VN=-R_1F_1+R_2(F_1-F_2)+R_3(F_2-F_3)+ \ldots +R_nF_{n-1}$.

In the present embodiment, the pieces of differential data $Q_{k+1}, \ldots,$ and $Q_{n-1}$ in the saturated region are values smaller than the pieces of differential data $Q_1, Q_2, Q_3, \ldots,$ and $Q_k$ in the linear region. Even when the output signal Vo has the linear region and the saturated region, the detection values $R_{k+1}, R_{k+2}, \ldots, R_{n-1},$ and $R_n$ in the saturated region are thereby substantially canceled by calculation of the pieces of differential data $Q_{k+1}, \ldots, Q_{n-1}$ in the saturated region. Accordingly, the first calculation circuit 71 can preferably detect the inclination of the detection values RG in the linear region by multiplication by the first filter FL1 to calculate the differential value VN.

Sixth Embodiment

Figure 20:
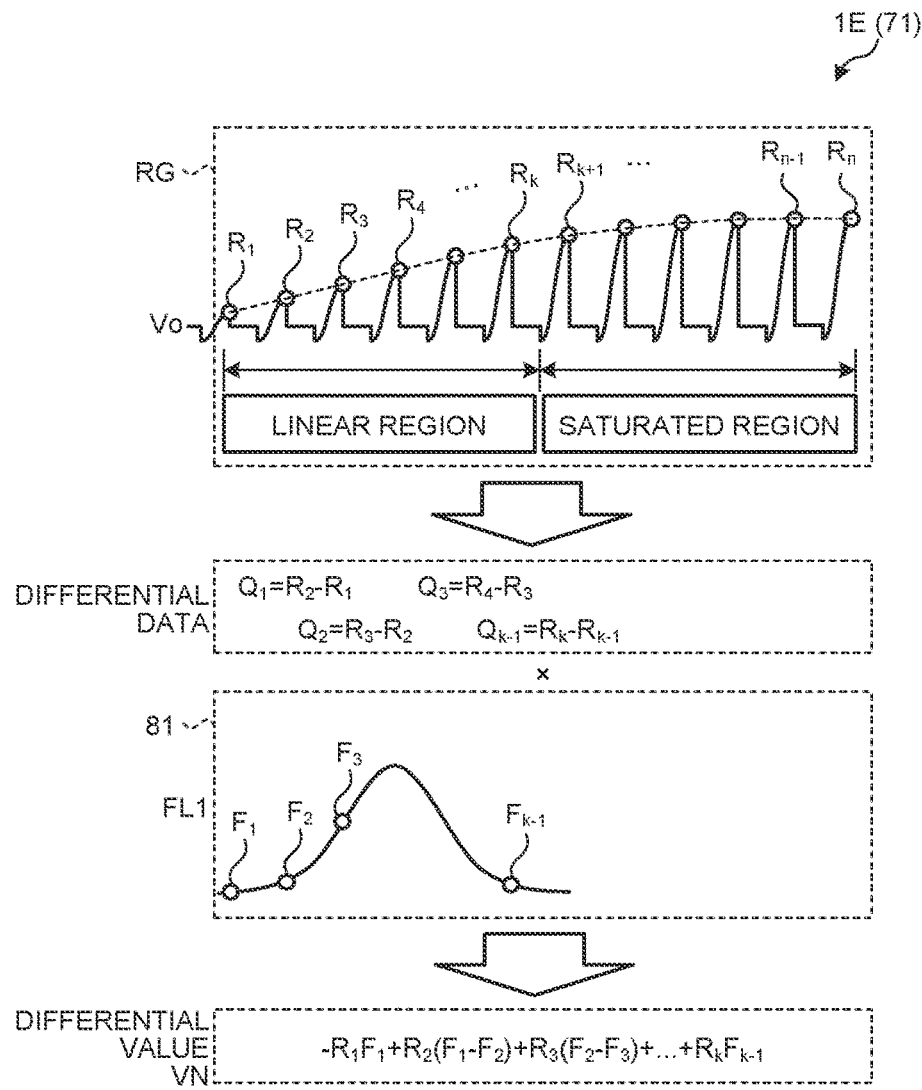
FIG. 20 is a descriptive view for explaining a calculation method of a first calculation circuit in an input detection system according to a sixth embodiment.

FIG. 20 is a descriptive view for explaining a calculation method of a first calculation circuit in an input detection system according to a sixth embodiment. As illustrated in FIG. 20, an input detection system 1E according to the sixth embodiment is different from that in the above-mentioned fifth embodiment in that the detection values $R_{k+1}, R_{k+2}, \ldots, R_{n-1},$ and $R_n$ in the saturated region are not used for calculation.

That is to say, the first calculation circuit 71 calculates the pieces of differential data $Q_1, Q_2, Q_3, \ldots,$ and $Q_{k-1}$ of the detection values $R_1, R_2, R_3, \ldots,$ and $R_k$ in the linear region. The first calculation circuit 71 multiplies the pieces of differential data $Q_1, Q_2, Q_3, \ldots,$ and $Q_{k-1}$ by the first filter FL1 (filter values $F_1, F_2, \ldots,$ and $F_{k-1}$) of the first table 81. In the present embodiment, the number of filter values $F_1, F_2, \ldots,$ and $F_{k-1}$ is (k−1) and does not include filter values F corresponding to the detection values $R_{k+1}, R_{k+2}, \ldots, R_{n+1},$ and $R_n$, in the saturated region of the output signal Vo. That is, the filter values F corresponding to the detection values $R_{k+1}, R_{k+2}, \ldots, R_{n+1},$ and $R_n$, in the saturated region are 0. The first calculation circuit 71 for the detection values RG sums up these values to calculate the differential value $VN=-R_1F_1+R_2(F_1-F_2)+R_3(F_2-F_3)+ \ldots +R_kF_{k-1}$.

In the present embodiment, even when the output signal Vo has the linear region and the saturated region, the first calculation circuit 71 can preferably detect the inclination of the detection values RG in the linear region by calculating the differential value VN using the detection values $R_1, R_2, R_3, \ldots,$ and $R_k$ in the linear region. The first calculation circuit 71 can reduce the calculation amount in comparison with the case in which the pieces of differential data Q are calculated from all of the detection values RG.

Although the example of calculating the pieces of differential data Q is described in the fifth embodiment and the sixth embodiment, the calculation method is not limited thereto. The first calculation circuit 71 can apply a similar calculation method to that in the first embodiment to the output signal Vo (detection values RG) having the linear region and the saturated region. For example, the first calculation circuit 71 may multiply the detection values RG in the saturated region by the first filter FL1-p of the positive sign and multiply the detection values RG in the linear region by the first filter FL1-m of the negative sign for calculation. Alternatively, the first calculation circuit 71 may desirably select two groups of the detection values RG without distinguishing the detection values RG into the detection values RG in the saturated region and the detection values RG in the linear region.

Seventh Embodiment

Figure 21:
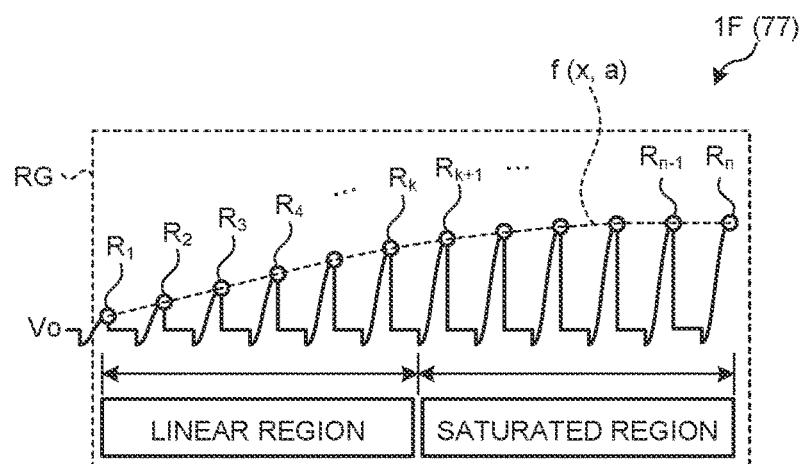
FIG. 21 is a descriptive view for explaining a calculation method of a fitting processing circuit in an input detection system according to a seventh embodiment.

The fifth embodiment and the sixth embodiment can be combined with the calculation method in the above-mentioned fourth embodiment. FIG. 21 is a descriptive view for explaining a calculation method of a fitting processing circuit in an input detection system according to a seventh embodiment. In an input detection system 1F according to the seventh embodiment illustrated in FIG. 21, the detection IC 51 includes the fitting processing circuit 77 similarly to the input detection system 1C according to the fourth embodiment (FIG. 16).

The fitting processing circuit 77 uses the detection values RG of the output signal Vo having a linear region and a saturated region for fitting with a function f(x, a) by a least-squares method or the like. For example, when the function f(x, a) is a linear function, the function f(x, a) is expressed by f(x, a)=$a_1$x+$a_0$. A parameter $a_1$ indicates an inclination of the detection values RG in a relation between the detection values RG and time, and a parameter $a_0$ indicates an intercept of the detection values RG. The fitting processing circuit 77 outputs the provided parameter a=($a_1$, $a_0$) to the calculation circuit 70 (refer to FIG. 16). The function f(x, a) may be a quadratic function, a cubic function, or the like.

In the seventh embodiment, the fitting processing circuit 77 may use the detection values $R_1$, $R_2$, $R_3$, . . . , and $R_k$ in the linear region for fitting similarly to the above-mentioned sixth embodiment.

Eighth Embodiment

In the first embodiment to the seventh embodiment as described above, the example in which the input support device 3 is arranged above the mutual electrostatic capacitance-type touch sensor 21 (display device 2) including the drive electrodes Tx and the detection electrodes Rx is described. The disclosure is however not limited thereto. The touch sensor 21 (display device 2) may be of a self-electrostatic capacitance type.

Figure 22:
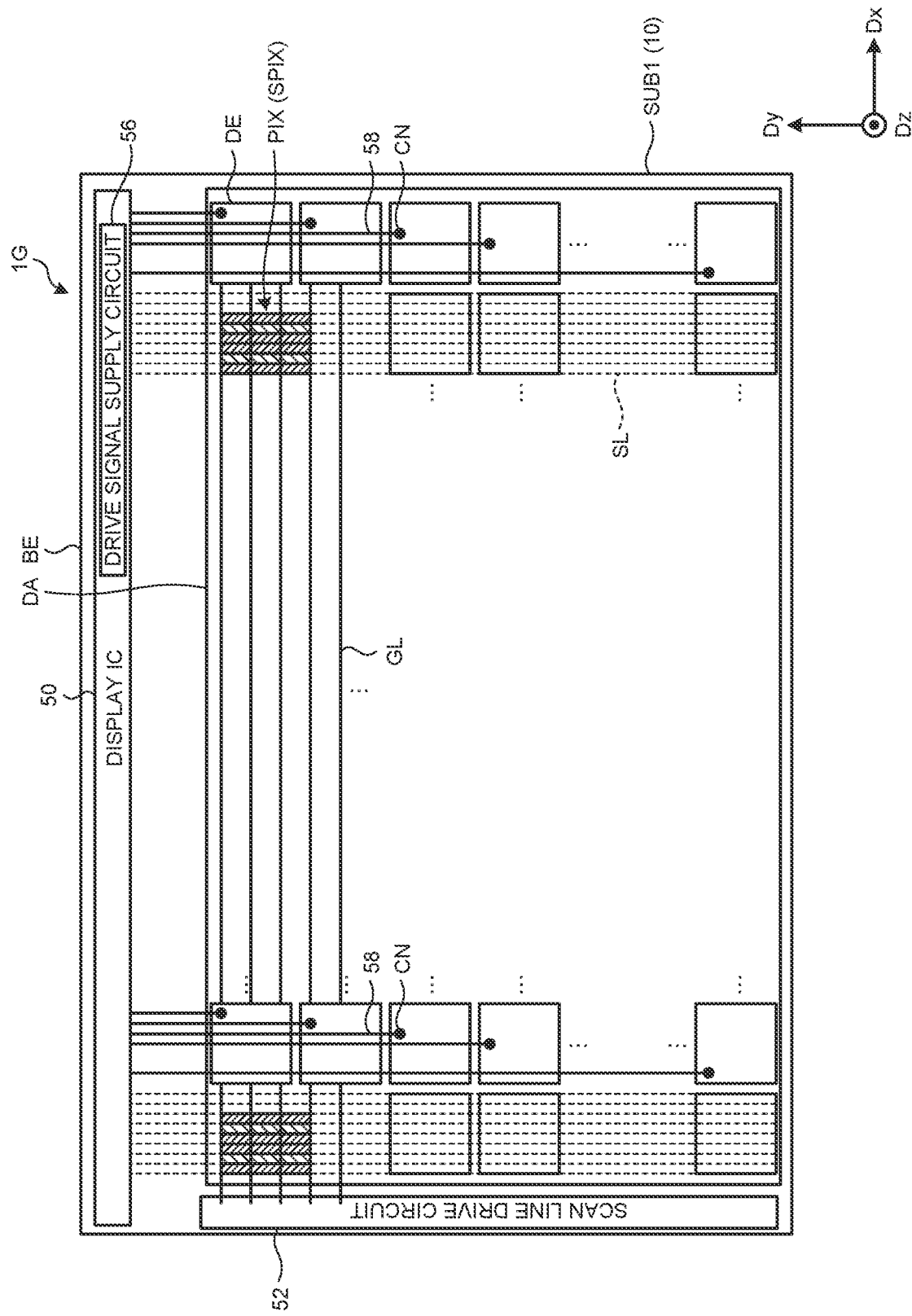
FIG. 22 is a plan view schematically illustrating an array substrate included in a display device according to an eighth embodiment.

FIG. 22 is a plan view schematically illustrating an array substrate included in a display device according to an eighth embodiment. As illustrated in FIG. 22, in an input detection system 1G according to the eighth embodiment, the array substrate SUB1 includes a plurality of detection electrodes DE. The detection electrodes DE are arrayed in a matrix with a row-column configuration in the display region DA.

Sensor wiring lines 58 are provided so as to correspond to the respective detection electrodes DE and are electrically coupled to the detection electrodes DE through contact holes CN. The sensor wiring lines 58 each extend along the second direction Dy and are aligned in the first direction Dx. The sensor wiring lines 58 and the pixel signal lines SL are coupled to the display IC 50 provided in the peripheral region BE.

The detection electrodes DE serve as common electrodes in display and the drive electrodes Tx and the detection electrodes Rx configured to detect detection targets such as the input support device 3 and the finger Fg. The display IC 50 may have a function of the detection IC 51 illustrated in FIG. 9 and the like. Alternatively, the detection IC 51 may be provided separately from the display IC 50.

The display IC 50 supplies the display drive signal VCOM to the detection electrodes DE in display. In detection of the detection target such as the input support device 3 and the finger Fg, the drive signal supply circuit 56 of the display IC 50 supplies the detection drive signal VD to the detection electrodes DE through the sensor wiring lines 58. The detection electrodes DE output the detection signals Vdet through the sensor wiring lines 58 based on change in self-electrostatic capacitances of the detection electrodes DE and resonance of the LC circuit 35. The display IC 50 (or the detection IC 51) detects the detection target such as the input support device 3 and the finger Fg based on the detection values RG (output signal Vo) provided by performing signal processing on the detection signals Vdet.

In self-electrostatic capacitance-type touch detection, the touch sensor 21 can supply the detection drive signal VD to all of the detection electrodes DE to detect the finger Fg or the like. On the other hand, in detection of the input support device 3, the detection drive signal VD is supplied to the detection electrodes DE in order so as to generate the resonance of the LC circuit 35.

Figure 23:
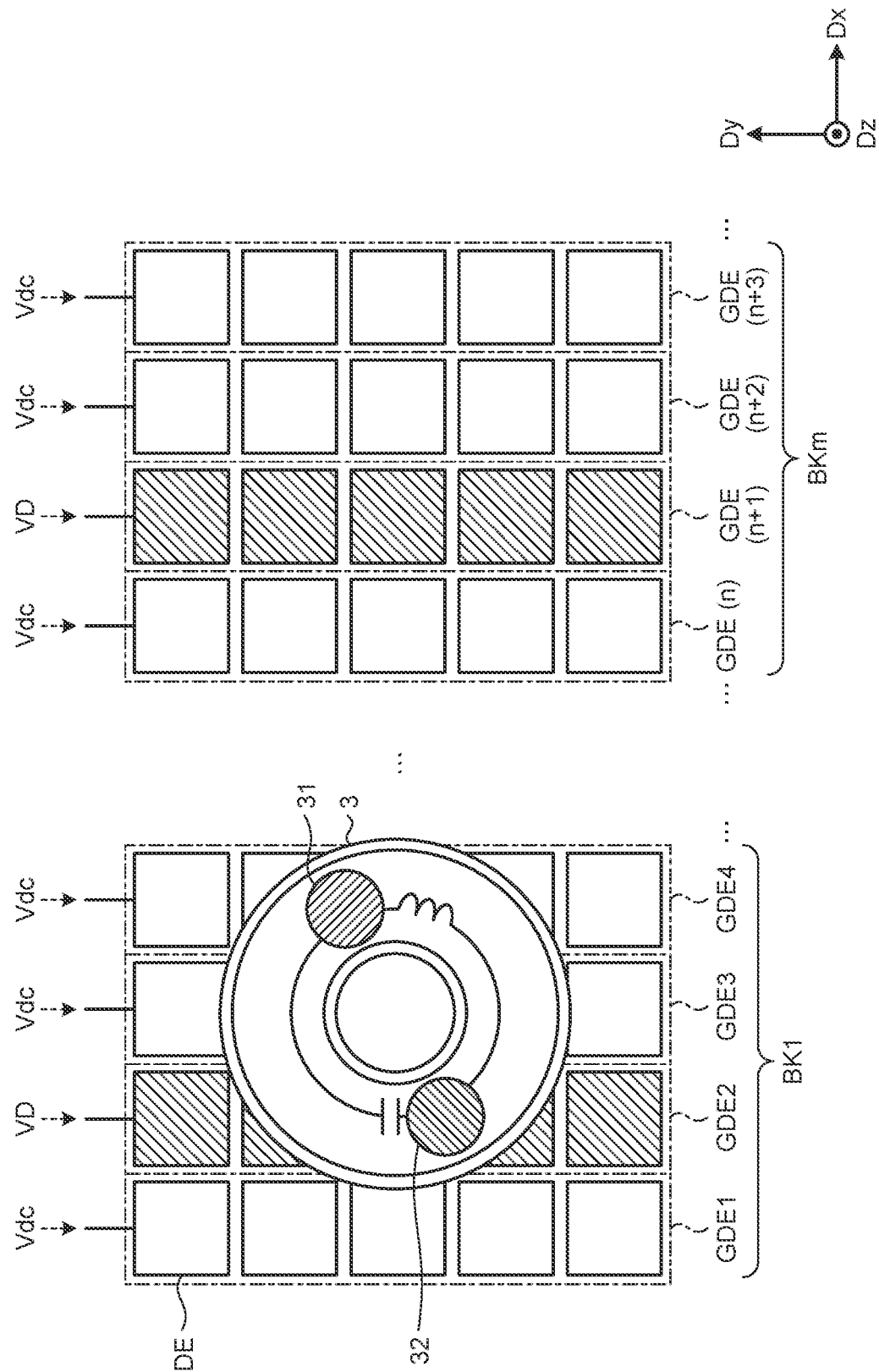
FIG. 23 is a plan view schematically illustrating an arrangement relation between an input support device and a plurality of detection electrodes according to the eighth embodiment.

FIG. 23 is a plan view schematically illustrating an arrangement relation between the input support device and the detection electrodes according to the eighth embodiment. FIG. 23 illustrates the detection electrodes DE to which the detection drive signal VD is supplied by hatching. As illustrated in FIG. 23, the input support device 3 is arranged so as to overlap with the detection electrodes DE. The first electrode 31 is arranged so as to overlap with at least one detection electrode DE (for example, a detection electrode group GDE4) of the detection electrodes DE. The second electrode 32 is arranged so as to overlap with the detection electrode DE (for example, a detection electrode group GDE2) different from the detection electrode DE with which the first electrode 31 overlaps.

The display IC 50 supplies the detection drive signal VD to the detection electrodes DE (for example, the detection electrode group GDE2) aligned in the second direction Dy simultaneously. The display IC 50 supplies the reference potential Vdc to the detection electrodes DE (for example, detection electrode groups GDE1, GDE3, and GDE4) adjacent, in the first direction Dx, to the detection electrodes DE to which the detection drive signal VD is supplied.

A plurality of detection electrode blocks BK are aligned in the first direction Dx while the detection electrode groups GDE of four columns are grouped into one detection electrode block BK. The display IC 50 supplies the detection drive signal VD with the same pattern in each of the detection electrode blocks BK aligned in the first direction Dx. In a detection electrode block BKm having detection electrode groups GDE(n), GDE(n+1), GDE(n+2), and GDE (n+3), the display IC 50 supplies the detection drive signal VD to the detection electrode groups GDE(n), GDE(n+1), GDE(n+2), and GDE(n+3) in a time division manner.

With this configuration, when the input support device 3 is arranged so as to overlap with the detection electrodes DE, the reference potential Vdc is supplied to the detection electrodes DE (for example, the detection electrode group GDE4) overlapping with the first electrode 31, and the detection drive signal VD is supplied to the detection electrodes DE (for example, the detection electrode group GDE2) overlapping with the second electrode 32. As a result, the second electrode 32 can increase the amplitudes of the detection signals Vdet using the resonance of the LC circuit 35.

The drive method of the detection electrodes DE illustrated in FIG. 23 is merely an example, and alignment, order, and the number of the detection electrodes DE to which the detection drive signal VD is supplied may be desirably set. Also in the present embodiment, the detection method and the calculation method in the above-mentioned first embodiment to seventh embodiment can also be employed.

Although the preferred embodiments of the present disclosure have been described above, the present disclosure is not limited by these embodiments. Contents disclosed in the embodiments are merely examples, and various modifications can be made in a scope without departing from the gist of the present disclosure. Appropriate modifications in a scope without departing from the gist of the present disclosure naturally belong to the technical scope of the present disclosure. At least one of various omission, replacement, and modification of the components can be performed in a scope without departing from the gist of the embodiments and modifications described above.

What is claimed is:

1. An input detection system comprising:
a plurality of electrodes aligned in a detection region;
a drive signal supply circuit configured to supply a drive signal to the electrodes;
a detection circuit configured to detect signals from the electrodes;
an input support device including an LC circuit and a first electrode and a second electrode coupled to the LC circuit and arranged so as to overlap with the electrodes;
a first calculation circuit configured to detect the input support device based on an output signal output from the detection circuit; and
a second calculation circuit configured to detect a detection target different from the input support device based on the output signal,
wherein
the output signal contains a plurality of detection values,
the first calculation circuit calculates a differential value of at least two of the detection values and detects the input support device based on the differential value, and
the second calculation circuit calculates an addition value of at least two of the
detection values and detects the detection target based on the addition value.

2. The input detection system according to claim 1, wherein
the detection circuit is coupled to the first calculation circuit,
the first calculation circuit is coupled to the second calculation circuit, and
the output signal is output from the detection circuit to the first calculation circuit and is output from the first calculation circuit to the second calculation circuit.

3. The input detection system according to claim 1, wherein
the detection circuit is coupled to the first calculation circuit and the second calculation circuit, and
the output signal is output from the detection circuit to the first calculation circuit and the second calculation circuit.

4. The input detection system according to claim 1, further comprising a storage circuit configured to store a first table including a plurality of first filter values corresponding to the detection values, wherein
the first calculation circuit calculates a plurality of pieces of differential data obtained by differentiating two of the detection values with different combinations of the detection values, and
the first calculation circuit calculates the differential value by multiplying the respective pieces of differential data by the first filter values.

5. The input detection system according to claim 4, wherein
a relation between the detection values and time has a linear region in which the detection values vary with a first inclination and a saturated region with a second inclination smaller than the first inclination, and
the first calculation circuit calculates the pieces of differential data for the detection values in the linear region and the detection values in the saturated region.

6. The input detection system according to claim 4, wherein
a relation between the detection values and time has a linear region in which the detection values vary with a first inclination and a saturated region with a second inclination smaller than the first inclination,
the first calculation circuit calculates the pieces of differential data from the detection values in the linear region, and
the first calculation circuit multiplies the pieces of differential data in the linear region by the first filter values.

7. The input detection system according to claim 1, wherein
a reference potential is supplied to the electrode overlapping with one of the first electrode and the second electrode, and
the drive signal supply circuit supplies the drive signal at a predetermined frequency to the electrode overlapping with another one of the first electrode and the second electrode.

8. An input detection system comprising:
a plurality of electrodes aligned in a detection region;
a drive signal supply circuit configured to supply a drive signal to the electrodes; a detection circuit configured to detect signals from the electrodes;
an input support device including an LC circuit and a first electrode and a second electrode coupled to the LC circuit and arranged so as to overlap with the electrodes;
a first calculation circuit configured to detect the input support device based on an output signal output from the detection circuit; and
a second calculation circuit configured to detect a detection target different from the input support device based on the output signal,
wherein
the output signal contains a plurality of detection values, and
the first calculation circuit calculates a differential value between a sum of the detection values of a first group and a sum of the detection values of a second group.

9. The input detection system according to claim 8, further comprising a storage circuit configured to store a first table including a plurality of first filter values corresponding to the detection values, wherein
the first calculation circuit multiplies the respective detection values of the first group by first filter values of a positive sign and multiplies the respective detection values of the second group by first filter values of a negative sign in which a polarity of the first filter values of the positive sign is inverted.

10. The input detection system according to claim 9, wherein
   the storage circuit stores a second table including a plurality of second filter values corresponding to the detection values,
   the second calculation circuit calculates an addition value by summing up values provided by multiplying the respective detection values by the second filter values, and
   the number of second filter values is larger than the number of first filter values.

11. The input detection system according to claim 8, wherein
   the detection circuit is coupled to the first calculation circuit,
   the first calculation circuit is coupled to the second calculation circuit, and
   the output signal is output from the detection circuit to the first calculation circuit and is output from the first calculation circuit to the second calculation circuit.

12. The input detection system according to claim 8, wherein
   the detection circuit is coupled to the first calculation circuit and the second calculation circuit, and
   the output signal is output from the detection circuit to the first calculation circuit and the second calculation circuit.

13. The input detection system according to claim 8, wherein
   a reference potential is supplied to the electrode overlapping with one of the first electrode and the second electrode, and
   the drive signal supply circuit supplies the drive signal at a predetermined frequency to the electrode overlapping with another one of the first electrode and the second electrode.

14. An input detection system comprising:
   a plurality of electrodes aligned in a detection region;
   a drive signal supply circuit configured to supply a drive signal to the electrodes;
   a detection circuit configured to detect signals from the electrodes;
   an input support device including an LC circuit and a first electrode and a second electrode coupled to the LC circuit and arranged so as to overlap with the electrodes,
   a fitting processing circuit configured to fit a relation between a plurality of detection values that an output signal output from the detection circuit contains and time to calculate an approximate expression; and
   a calculation circuit configured to detect at least one of the input support device and a detection target different from the input support device based on a plurality of pieces of information of the approximate expression received from the fitting processing circuit.

15. The input detection system according to claim 14, wherein the calculation circuit configured to detect the input support device based on an inclination in the relation between the detection values and the time.

16. The input detection system according to claim 14, wherein the calculation circuit configured to detect the detection target based on an intercept in the relation between the detection values and the time.

17. The input detection system according to claim 14, wherein the fitting processing circuit configured to calculate an approximate expression of a linear function by fitting the relation between the detection values and the time.

* * * * *